(12) United States Patent
Miyamoto

(10) Patent No.: US 8,941,855 B2
(45) Date of Patent: Jan. 27, 2015

(54) IMAGE PROCESSING APPARATUS TO REGISTER EXPENSE INFORMATION, A METHOD FOR CONTROLLING THE SAME, AN IMAGE PROCESSING SYSTEM, AND A STORAGE MEDIUM

(71) Applicant: Canon Kabushiki Kaisha, Tokyo (JP)

(72) Inventor: Daijiro Miyamoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/783,750

(22) Filed: Mar. 4, 2013

(65) Prior Publication Data
US 2013/0242337 A1 Sep. 19, 2013

(30) Foreign Application Priority Data
Mar. 15, 2012 (JP) ................. 2012-058654

(51) Int. Cl.
*G06F 15/00* (2006.01)
*G06F 3/12* (2006.01)
*G06K 1/00* (2006.01)
*H04N 1/00* (2006.01)
*H04N 1/34* (2006.01)
*H04N 1/44* (2006.01)
*G06Q 50/18* (2012.01)

(52) U.S. Cl.
CPC .......... *H04N 1/00838* (2013.01); *H04N 1/344* (2013.01); *H04N 1/346* (2013.01); *H04N 1/4426* (2013.01); *G06Q 50/18* (2013.01); *H04N 2201/0094* (2013.01)
USPC ........................................ 358/1.14; 358/1.15

(58) Field of Classification Search
CPC ... H04N 1/00838; H04N 1/344; H04N 1/346; H04N 1/4426; H04N 1/0094
USPC ................................ 358/1.1, 1.14, 1.15, 1.13
See application file for complete search history.

(56) References Cited

U.S. PATENT DOCUMENTS 8,203,765 B2 * 6/2012 Pandipati ...................... 358/474
2002/0097847 A1 * 7/2002 Kozo .......................... 379/88.17
2012/0185368 A1 * 7/2012 Schloter et al. ................. 705/30

FOREIGN PATENT DOCUMENTS

JP 2011-59254 A 3/2011

* cited by examiner

*Primary Examiner* — Douglas Tran
(74) *Attorney, Agent, or Firm* — Canon USA Inc IP Division

(57) ABSTRACT

A user has manually registered expenses generated due to use of an MFP, which causes a problem of burdensome registration work. An image processing apparatus for registering expense information in an expense management apparatus, includes a requesting unit configured to request authentication of a user to the expense management apparatus, an acquisition unit configured to acquire pieces of matter information of the user authenticated by the expense management apparatus, a selection unit configured to select one of the pieces of matter information acquired by the acquisition unit, a job execution unit configured to execute a job using hardware resources included in the image processing apparatus, and a registration unit configured to register expense information based on the job executed by the job execution unit as expense information of the matter information selected by the selection unit in the expense management apparatus.

10 Claims, 25 Drawing Sheets

FIG.8

| Matter Name (801) | Person In Charge (802) | Status (803) | Last Updated (804) |
|---|---|---|---|
| Matter A | User 1 | Active | 2012/1/1 |
| Matter B | User 2 | Closed | 2011/10/1 |
| Matter C | User 1 | Closed | 2011/9/1 |
| Matter D | User 2 | Active | 2011/11/1 |

| ID | EVENT TYPE | OCCURRENCE TIME |
|---|---|---|
| 001 | PANEL DISPLAYED | 2012/1/1 9:58:00 |
| 002 | LOGGED IN | 2012/1/1 9:58:10 |
| 003 | COPY PROCESSING STARTED | 2012/1/1 10:00:00 |
| 004 | COPY START INSTRUCTION RECEIVED | 2012/1/1 10:02:50 |
| 005 | LOGGED OUT | 2012/1/1 10:05:20 |

FIG.15

| 1501 | 1502 | 1503 | 1504 | 1505 | 1506 | 1507 | 1508 | 1509 |
|---|---|---|---|---|---|---|---|---|
| ID | Type | Job Execution Start Time | Job Execution End Time | Status | Execution User | Number Of Pages | Number Of Sheets | Detailed Setting |
| 001 | Copy | 2011/12/25 15:00:00 | 2011/12/25 15:05:00 | COMPLETED | User 3 | 10 | 10 | COLOR, ONE-SIDED |
| 002 | Print | 2012/1/1 8:10:00 | 2012/1/1 8:11:00 | COMPLETED | User 1 | 5 | 5 | COLOR, ONE-SIDED |
| 003 | Fax | 2012/1/1 9:20:00 | 2012/1/1 9:22:00 | FAILED | User 2 | 2 | 2 | |
| 004 | Copy | 2012/1/1 10:03:00 | 2012/1/1 10:05:00 | COMPLETED | User 1 | 10 | 5 | BLACK AND WHITE, TWO-SIDED |

FIG.17

| 1701 | 1702 | 1703 | 1704 | 1705 | 1706 | 1707 | 1708 | 1709 | 1710 |
|---|---|---|---|---|---|---|---|---|---|
| Job Type | Charging Method | Bill Status | Start Timing | End Timing | Counting Method | Date | Billing Code | Rate | Condition |
| Copy | Time | Billable | Copy Processing Started | Log End Time | | Copy Processing Started | Copy | 1 | |
| Copy | Expense | Billable | | | Number Of Pages | Copy Processing Started | Copy | 10 | |
| Print | Expense | Billable | | | Number Of Pages | Printing Processing Started | Copy | 10 | |
| Fax | Expense | Do Not Bill | | | Number Of Pages | Facsimile Processing Started | Fax | 5 | |

FIG.18

SETTING OF EXPENSE INFORMATION REGISTRATION

Function: [Copy ▼]
Type: [Time ▼]   Billing Code: [Copy ▼]
Bill Status: [Billable ▼]   Rate: [1.0]
Start Timing: [Copy Processing Start ▼]   Condition: [ ]
End Timing: [Log End Time ▼]
Date: [Copy Processing Start ▼]

Function: [Copy ▼]
Type: [Expense ▼]   Billing Code: [Copy ▼]
Bill Status: [Billable ▼]   Rate: [10]
Counting Method: [Number Of Pages ▼]   Condition: [ ]
Date: [Copy Processing Start ▼]

Function: [Print ▼]
Type: [Expense ▼]   Billing Code: [Copy ▼]
Bill Status: [Billable ▼]   Rate: [10]
Counting Method: [Number Of Pages ▼]   Condition: [ ]
Date: [Printing Processing Start ▼]

[+] ADDITION OF EXPENSE INFORMATION REGISTRATION SETTING

FIG.19

EXPENSE INFORMATION LIST

[ADD] [DELETE] [EDIT]

| Type | Bill Status | Date | Matter | User | Billing Code | Units | Rate | Total Amount |
|---|---|---|---|---|---|---|---|---|
| Time | Billable | 2012/1/1 | Matter A | User 1 | Copy | 5.0 | 1 | 5 |
| Expense | Billable | 2012/1/1 | Matter A | User 1 | Copy | 10.0 | 10 | 100 |

Password: ▭

Login

Card Login

IMAGE PROCESSING APPARATUS TO REGISTER EXPENSE INFORMATION, A METHOD FOR CONTROLLING THE SAME, AN IMAGE PROCESSING SYSTEM, AND A STORAGE MEDIUM

BACKGROUND OF THE INVENTION

1. Field of the Invention

The present disclosure relates to a system for registering expense information in a management apparatus based on operations in an image processing apparatus.

2. Description of the Related Art

Recently, digital multifunction peripherals (MFPs) having hardware resources such as a scanner or a printer are installed in offices or other facilities to be used for daily office work including processing such as copying, printing, and facsimile transmission.

In the offices or other facilities where such MFPs are installed, expenses for using a MFP, such as a printing expense for copying, an expense based on time of occupying the MFP for the copying, and labor costs of a user who has carried out the copying, may sometimes be charged to a client.

For example, in a law firm, expenses generated because a lawyer has used the MFP for a certain legal matter may be charged to a client who is a request source of the matter. As a system for charging such expenses to the client who is a request source of the matter, there is known a system that enables a lawyer in charge to manage the expenses by inputting expense information to a computer and charge the expenses to the client at the end of the matter.

Japanese Patent Application Laid-Open No. 2011-59254 discusses an image forming apparatus for tallying and outputting, when a user logs in the image forming apparatus and carries out a copying operation, the number of copies for each work (planning department work or engineering department work) of the user.

Conventionally, however, the expenses generated by using MFPs have been registered in the computer manually by a person in charge of the work at the company or at the office. As a result, the registration operation of the expense information has been very burdensome for the person in charge.

Japanese Patent Application Laid-Open No. 2011-59254 discusses the image forming apparatus for tallying the number of copies for each work of the user who logs in the apparatus. However, the image forming apparatus discussed in Japanese Patent Application Laid-Open No. 2011-59254 only prints the tallied number of copies in a paper medium or other medium while not executing any processing such as registering in an expense management apparatus.

SUMMARY OF THE INVENTION

The present disclosure is directed to a mechanism that enables information of expenses generated by using an MFP in an expense management apparatus to be registered.

According to an aspect disclosed herein, an image processing apparatus for registering expense information in an expense management apparatus, includes a requesting unit configured to request authentication of a user to the expense management apparatus, an acquisition unit configured to acquire pieces of matter information of the user authenticated by the expense management apparatus, a selection unit configured to select one of the pieces of matter information acquired by the acquisition unit, a job execution unit configured to execute a job using hardware resources included in the image processing apparatus, and a registration unit configured to register expense information based on the job executed by the job execution unit as expense information of the matter information selected by the selection unit in the expense management apparatus.

According to the present disclosure, expense information generated by using an image processing apparatus by a user can be registered in an expense management apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the inventive principles disclosed herein.

FIG. 8 is a table illustrating an example of a "matter" that the MFP acquires from the expense management apparatus.

FIG. 15 is a table illustrating an example of data of a job log at the MFP.

FIG. 17 is a diagram illustrating an example of an expense information creation table for creating expense information to be stored in the expense management apparatus.

FIG. 18 is a diagram illustrating an example of a screen for setting the expense information creation table illustrated in FIG. 17.

FIG. 19 is a diagram illustrating an example of a screen of an expense information list displayed by the expense management apparatus.

FIG. 21 is a diagram illustrating an example of a log-in screen for logging in the MFP according to the second exemplary embodiment.

DESCRIPTION OF THE EMBODIMENTS

Various exemplary embodiments, features, and aspects of the disclosure will be described in detail below with reference to the drawings.

[System Configuration]

Figure 1:
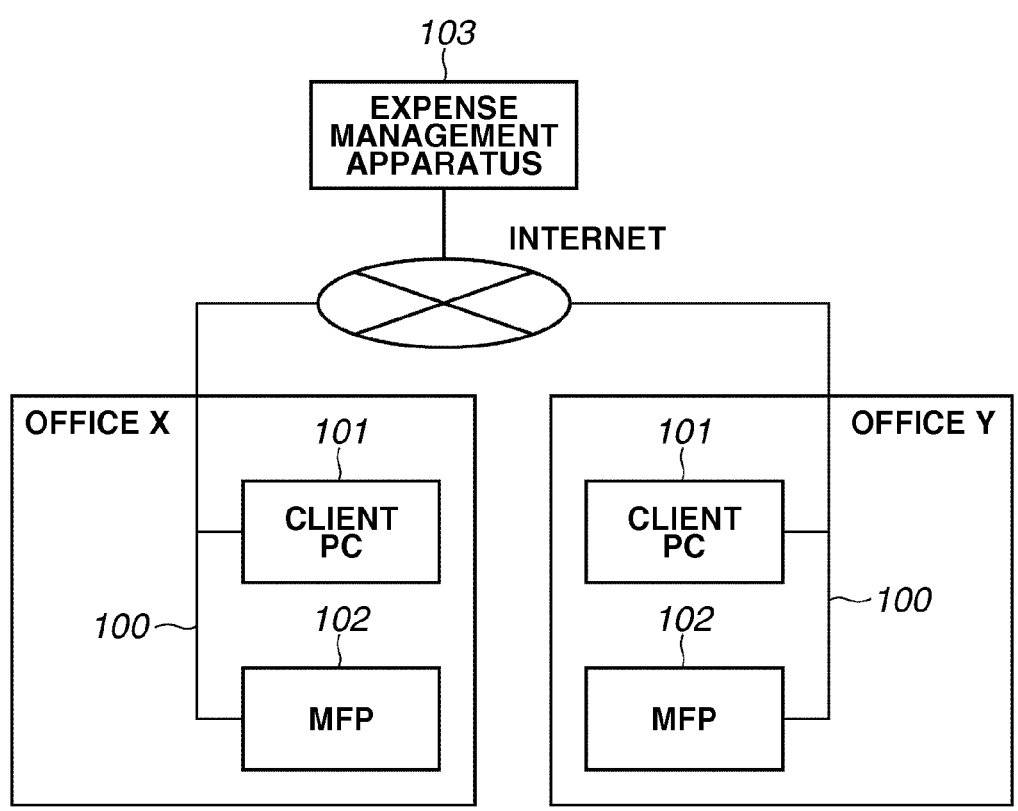
FIG. 1 is a diagram illustrating an example of a system configuration of an expense management system.

Referring to FIG. 1, a configuration of an expense management system according to a first exemplary embodiment will be described.

The expense management system, which is a network system constructed by a group of apparatuses illustrated in FIG. 1, includes a client PC 101, a digital multifunction peripheral (MFP) 102 that is an example of an image processing apparatus, and an expense management apparatus 103. The client PC 101 and the MFP 102 are connected to a local area network 100 constructed on an office basis such as an X office, or a Y office.

The local area network constructed by such an office unit is further connected to the Internet, and the apparatus (client PC 101 or MFP 102) in the local area network communicates with the expense management apparatus 103 via the Internet. Actually, relay devices such as a proxy server, a router, and a switching hub are present between the client PC 101 and the MFP 102. However, FIG. 1 does not illustrate the relay devices.

While not illustrated in FIG. 1, a firewall is present between the expense management apparatus 103 and the Internet. By this firewall, packets from the Internet to the expense management apparatus 103 are filtered or vice versa. Specifically, a packet transmitted from the Internet to the device in the local area network is discarded by the firewall.

The MFP 102 has a copy function, a print function, and a facsimile function, a detailed configuration of which will be described below. A plurality of MFPs 102 and a plurality of client PCs 101 are all identical for convenience.

The expense management apparatus 103 is a server for providing cloud services through the Internet. In the present exemplary embodiment, the expense management apparatus 103 manages, based on, for example, a matter of a request source handled at work of a law firm, information of expenses for each matter. In the present exemplary embodiment, the "matter" represents one case to be processed in association with the expense information. For example, at the law firm, a case unique to one lawsuit, one contract, or one work is managed as a matter.

In the present exemplary embodiment, the expense management apparatus 103 also manages, when a certain expense is generated by copying, printing, or facsimile transmission at the MFP 102 to be charged to a client, information of the expense.

The "expenses" mean, for example, a printing expense for copying, an expense based on time of occupying the MFP for the copying, and labor costs of a person in charge who has carried out the copying.

The expense management apparatus 103 further manages electronic data acquired by scanning a paper medium at the MFP 102.

Thus, the expense management apparatus 103 provides services for managing the expense information and the other data as cloud services, and can provide services in response to requests from all networks through the Internet.

However, the network system described above is only an example. For example, the expense management apparatus 103 can be installed in the local area network of each office.

The client PC 101, in which various applications are installed, can instruct printing to the MFP 102 via, for example, a printer driver. Further, the client PC 101, in which a web browser is installed, can access the expense management apparatus 103 to register the expense information.

[Hardware Configuration]

Figure 2:
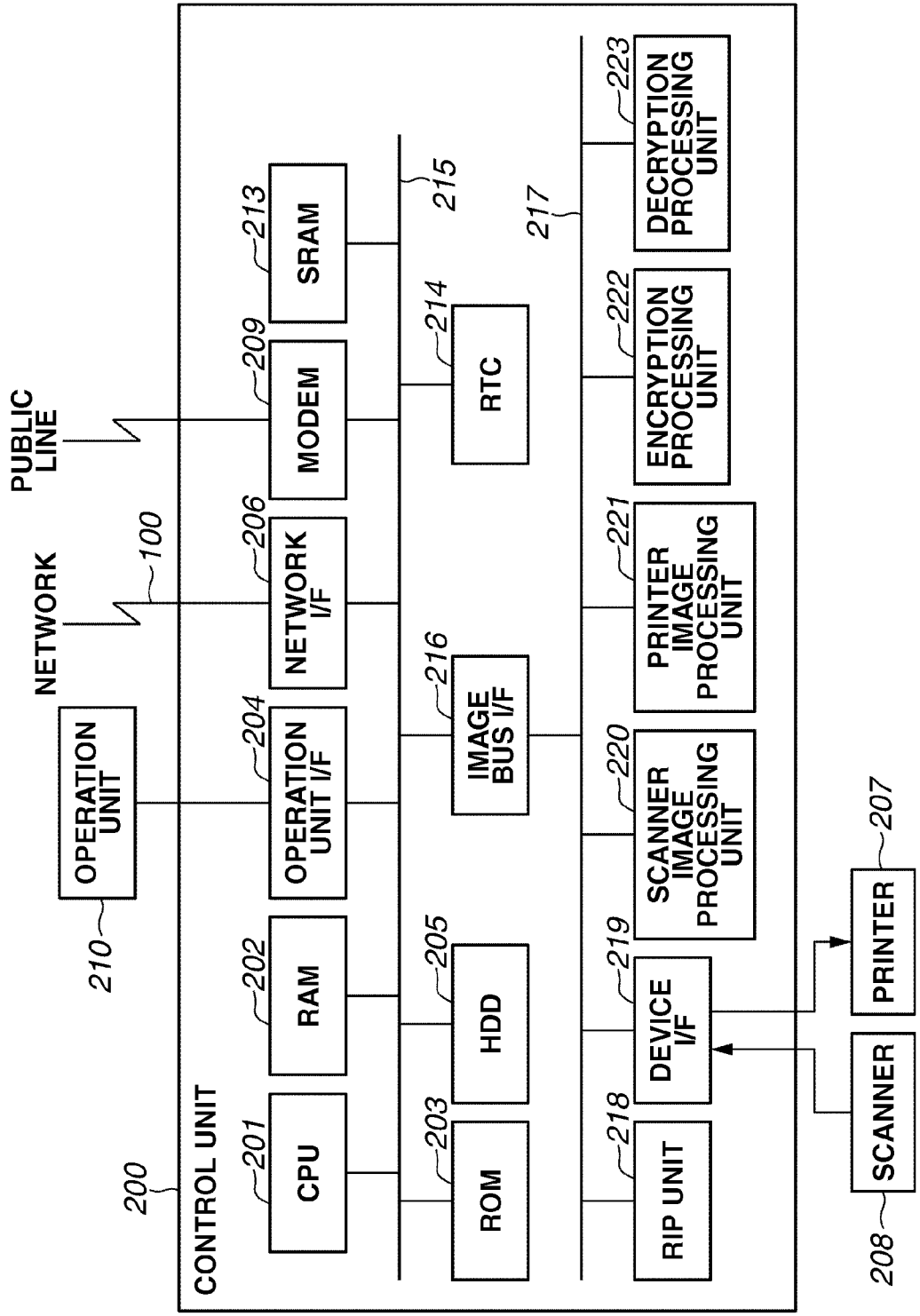
FIG. 2 is a block diagram illustrating an example of a hardware configuration of a MFP.
Figure 3:
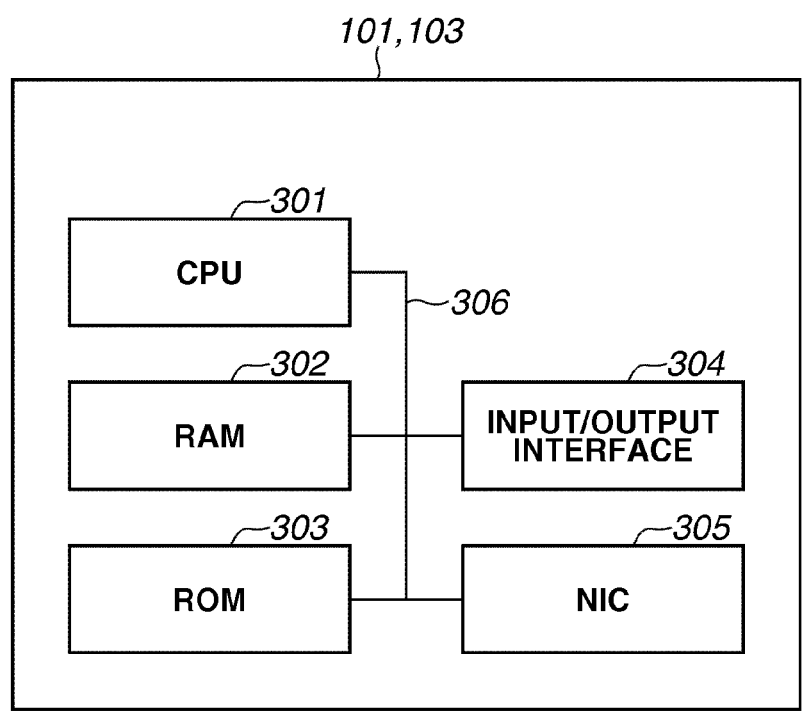
FIG. 3 is a block diagram illustrating an example of a hardware configuration of an expense management apparatus.

Referring to FIGS. 2 and 3, the hardware configuration of the apparatuses constituting the expense management system according to the present exemplary embodiment will be described.

[Hardware Configuration—MFP 102]

FIG. 2 illustrates an example of the hardware configuration of the MFP 102.

FIG. 2 is a block diagram schematically illustrating the configuration of the MFP 102 according to the present exemplary embodiment. A control unit 200 is connected to a scanner 208 serving as an image input device or a printer 207 serving as an image output device, and also connected to the network 100 or a public line to input and output image information or device information.

A central processing unit (CPU) 201 is a processor for controlling the entire MFP 102. A random access memory (RAM) 202 is a system work memory for enabling the CU 201 to operate, and also serves as an image memory for temporarily storing image data. According to instructions from the CPU 201, the MFP 102 can communicate with the client PC 101 and the expense management apparatus 103 via a network interface 206.

For example, the MFP 102 receives print data from the client PC 101, logs in the expense management apparatus 103, or transmits/receives data of registration of expense information (information of expenses for work carried out by a person in charge at a law firm for a certain matter).

The RAM 202 functions as a main memory or a work area of the CPU 201. The RAM 202 stores setting information of the MFP or an operation log when each processing is executed. A read-only memory (ROM) 203 is a boot ROM for storing a boot program of the system. A hard disk drive (HDD) 205 stores system software, an application, and image data.

Programs for executing processes of flowcharts of FIGS. 12, 14, 16, 24, and 25 described below are stored in the HDD 205 or the ROM 203. Each step of the flowcharts is executed by the CPU 201. However, a processor other than the CPU 201 may execute each step of the flowcharts, or the CPU 201 and the other processor may cooperate with each other to execute the processes of the flowcharts.

An operation unit interface 204 controls displaying on a display, a key input on the display, and a hard key input, and outputs the image data to an operation unit 210 to be displayed thereon. The operation unit interface 204 also transmits information input by a user of the system to the CPU 201.

The network interface 206 is connected to the network 100 to input/output information. A modulator/demodulator (MODEM) 209 is connected to the public line to input/output the information. A static RAM (SRAM) 213 is a nonvolatile recording medium operable at a high speed.

A real time clock (RTC) 214 executes processing of continuously counting current time even when power for the control unit 200 is not ON. In the present exemplary embodiment, the RTC 214 is used when time concerning a job log or an operation log described below is stored in a storage device. These devices are arranged on a system bus 215.

An image bus interface (I/F) 216 is a bus bridge that connects the system bus 215 to an image bus 217 for transferring the image data at a high speed and converts a data structure. The image bus 217 includes a Peripheral Component Interconnect (PCI) bus or Institute of Electrical and Electronics Engineers (IEEE) 1394. The following devices are arranged on the image bus 217. A raster image processor (RIP) unit 218 rasterizes page description language (PDL) data to a bitmap image.

A device I/F 219 connects the scanner 208 or the printer 207 to the control unit 200 and converts the image data between a synchronous system and an asynchronous system. A scanner image processing unit 220 corrects, processes, and edits input image data. A printer image processing unit 221 executes printer correction and resolution conversion for print output image data. An encryption processing unit 222 encrypts input data including the image data. A decryption processing unit 223 decrypts the encrypted data.

[Hardware Configuration—Expense Management Apparatus 103]

FIG. 3 is a block diagram illustrating an example of a hardware configuration of the client PC 101 and the expense management apparatus 103.

The expense management apparatus 103 includes a CPU 301, a RAM 302, a ROM 303, an input/output interface 304, a network interface card (NIC) 305, and a bus 306.

The CPU 301 executes an operating system (OS), a general application, and a program loaded to a program ROM of the ROM 303, and controls devices connected to the bus 306 as a whole. The ROM 303 further stores an operating system program as a control program of the CPU 301, and various data. The RAM 302 functions as a main memory or a work area.

The input/output interface 304 controls displaying on the display or a key input on the display. The NIC 305 is connected to the network 100 to execute communication control processing with the other device (client PC 101 or MFP 102) similarly connected to the network 100.

The hardware configuration of the apparatuses illustrated in FIG. 1 has been described. The hardware configuration of the client PC 101 has been described referring to FIG. 3. Actually, however, the client PC 101 includes, in addition to those described above, a display, a keyboard, and a mouse that function as user interfaces.

[Software Configuration]

Figure 4A:
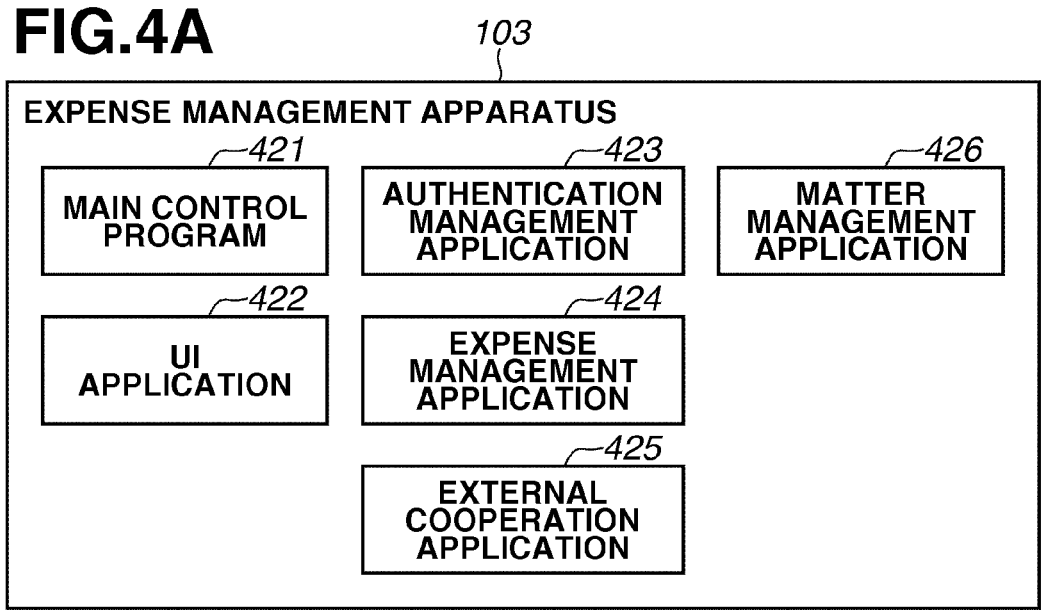
FIGS. 4A to 4C are block diagrams illustrating an example of a software configuration of the expense management system.
Figure 4B:
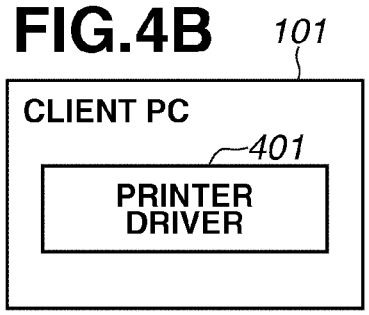
Figure 4C:
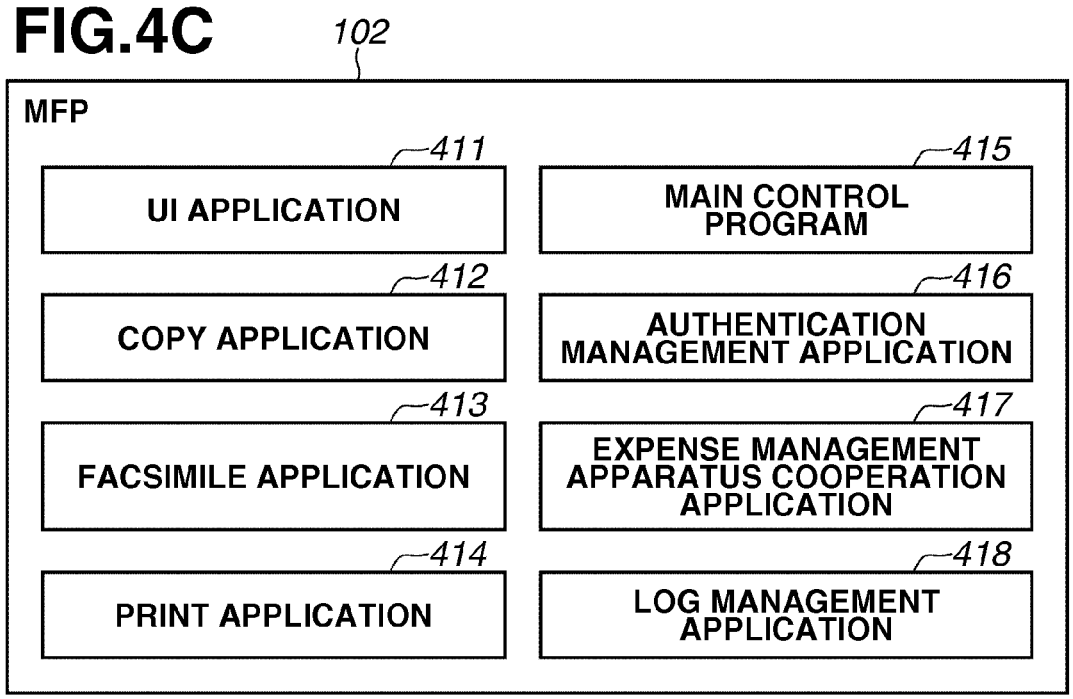

FIGS. 4A to 4C illustrate a software configuration of an expense information registration system according to the present exemplary embodiment. Each block of FIGS. 4A to 4C illustrates a function realized by executing software (program) processed by each apparatus illustrated in FIG. 1.

More specifically, programs 421 to 426 are stored in the ROM included in the expense management apparatus 103, and executed by the CPU similarly included in the expense management apparatus 103. Programs 411 to 418 are stored in the ROM 203 or the HDD 205 included in the MFP 102, and executed by the CPU 201 included in the MFP 102. A program 401 is stored in the ROM included in the client PC 101, and executed by the CPU included in the client PC 101.

[Software Configuration—Client PC 101]

The client PC 101 issues printing instruction of application data created by a document application installed in the client PC 101 to the MFP 102 via the printer driver 401.

The printer driver 401, which has a function of instructing reservation printing, instructs reservation printing to the MFP 102. The reservation printing function is for storing PDL data (or bitmap image rasterized from PDL data) output from the client PC 101 or the like, and prints its print data according to a user's operation at the operation unit 210 of the MFP 102.

[Software Configuration—MFP 102]

The MFP 102 carries out a copy job for executing copy processing, a print job for the printing data received from the client PC 101, and a facsimile transmission job for transmitting the image data via the MODEM 209.

While not illustrated in FIGS. 4A to 4C, the MFP 102 that has a network function can carry out a job for executing electronic mail transmission, Internet facsimile transmission, and file transmission. Execution of the jobs is controlled as a whole by the main control program 415.

First, the case of copying will be described. The main control program 415 instructs the user interface (UI) application 411 to display a copy screen on the operation unit 210. The UI application 411 instructs the main control program 415 to carry out the copy job based on a user's input made via the operation unit 210.

The main control program 415, which has received the execution instruction of the copy job from the UI application 411, instructs the copy application 412 to carry out the copy job.

The copy application 412, which has received the execution instruction of the copy job, controls the hardware resources such as the scanner 208 or the printer 207 to carry out the copy job. Specifically, the scanner image processing unit 220 corrects, processes, or edits the image data input from the scanner 208, and the printer image processing unit 221 corrects the image data or converts its resolution. Then, by instructing the printer 207 to print the image, the image is output to a printing medium such as a sheet of paper.

Next, the case of printing will be described. First, the main control program 415 receives a reservation printing instruction received from the client PC 101 via the network 100. The main control program 415, which has received the reservation printing instruction, transfers PDL data included in the reservation printing instruction to the print application 414.

The print application 414 stores print data of the reservation printing in the RAM 202 or the HDD 205 for a fixed period of time. Then, when receiving printing start instruction of the reservation printing from the user via the operation unit 210, the UI application 411 instructs the main control program 415 to carry out the print job for printing the print data based on a user's input from the operation unit 210.

The main control program 415, which has received the execution instruction of the print job from the UI application 411, instructs the print application 414 to print the data. The print application 414 acquires the data stored in the RAM 202 or the like based on an identifier of the printing target data included in the print processing instruction, and instructs the printer 207 to print the image of the printing target data on a printing medium such as a sheet of paper.

Next, the case of facsimile transmission will be described. First, the main control program 415 instructs the UI application 411 to display a facsimile transmission screen on the operation unit 210.

The UI application 411 instructs the main control program 415 to carry out the facsimile transmission job based on a user's input. The main control program 415, which has received the facsimile transmission execution from the UI application 411, instructs the facsimile application 413 to transmit facsimile data.

The facsimile application 413, which has received the facsimile transmission instruction, carries out the facsimile transmission job. Specifically, the facsimile application 413 processes the image data generated by optically reading a document via the scanner 208, and faxes the image data as facsimile data via the MODEM 209 and the public line according to the facsimile transmission instruction.

After an end of the execution of each of the copy job, the print job, and the facsimile transmission job, the log management application 418 writes a job log in the HDD 205. Data stored as the job log is log data of one job, for example, start time of job execution, end time of the job execution, or setting contents of other jobs.

The job log is written when each application (copy application 412 in the case of copying, and facsimile application 413 in the case of facsimile transmission) instructs writing to the log management application 418.

The log management application 418, which has received the writing instruction of the job log, stores the received job log in the HDD 205. The stored job log is acquired from the HDD 205 by the log management application 418 when the log acquisition instruction is received from the main control program 415 or the authentication management application 416.

The authentication management application 416 manages setting information or a right (right to use) of using the function of the MFP 102 for each user of the MFP 102, and determines presence of a right to use for each user. In addition, the authentication management application 416 instructs processing of requesting user authentication to the expense management apparatus 103 (authentication processing) or processing of registering expense information (expense information registration processing) to the expense management apparatus cooperation application 417.

Figure 6:
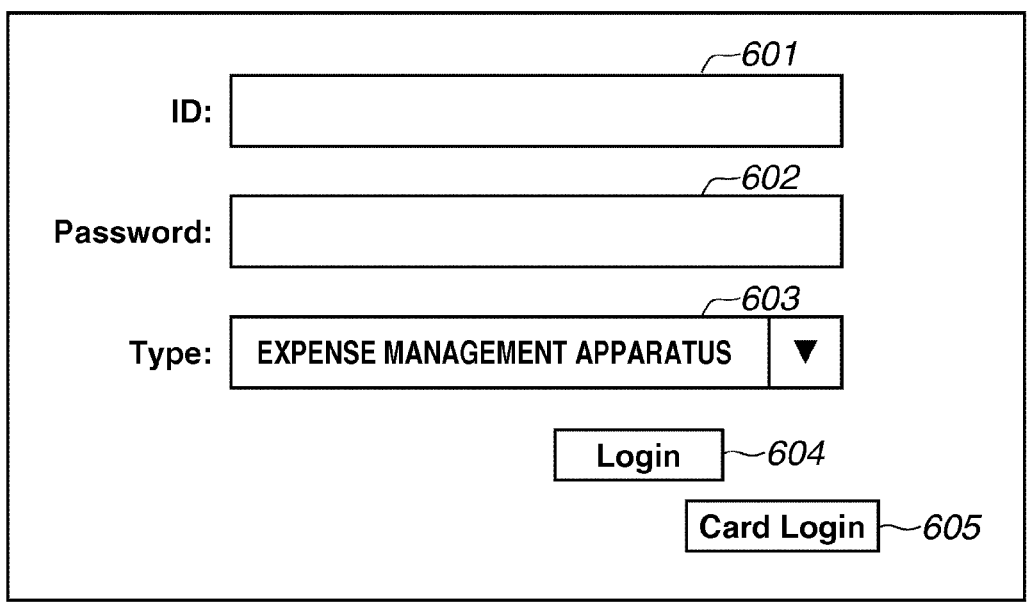
FIG. 6 is a diagram illustrating an example of a log-in screen of the MFP.

When the user operates the MFP 102 (instructs activation of MFP 102), first, the authentication management application 416 instructs the UI application 411 to display an authentication screen. Accordingly, a log-in screen illustrated in FIG. 6 is displayed on the operation unit 210, and an authentication operation is carried out via the log-in screen.

The UI application 411 instructs authentication to the authentication management application 416 based on a user's operation on the log-in screen. The authentication management application 416 collates ID and a password (identification information of user) included in the authentication instruction with authentication information stored in the ROM 203 of the MFP 102. Then, the authentication management application 416 determines authentication OK or NG, and presence of a right to use of each function of the MFP 102.

To cooperate with the expense management apparatus 103, a log-in request is made to the expense management apparatus cooperation application 417 based on the ID and the password (identification information of user) included in the authentication instruction. The expense management apparatus cooperation application 417 that has received the log-in request creates log-in request information, and transmits the log-in request to the external cooperation application 425 of the expense management apparatus 103 via the network 100.

The expense management apparatus cooperation application 417 exchanges data with the expense management apparatus 103 via the network 100. For example, the expense management apparatus cooperation application 417 requests logging-in or registers expense information by using the external cooperation application 425 of the expense management apparatus 103.

[Software Configuration—Expense Management Apparatus 103]

The expense management apparatus 103 manages the expense information. The expense information is managed in association with a matter.

The main control program 421 controls the expense management apparatus 103. For the input from the user or other devices, the UI application 422 or the external cooperation application 425 requests processing to the main control program 421.

The UI application 422 executes processing in response to a request made from a web browser of the client PC 101 or the like via the network 100, and returns hypertext markup language (HTML) data to be displayed on the web browser of the client PC 101. Communication is carried out by using protocol such as hypertext transfer protocol (HTTP).

An authentication management application 423 authenticates a user in response to a log-in request from outside, and manages setting information of the user and controls an access right to each function for each user. The log-in request is issued from the MFP 102 or the like via the network 100. The setting information of the user is stored in the RAM 302 in the expense management apparatus 103. When receiving the log-in request, the authentication management application 423 reads data from the RAM 302, and collates the data with an ID and a password (identification information of user) included in the log-in request to authenticate the user.

An expense information management application 424 receives instruction from the UI application 422 or the external cooperation application 425 to execute processing such as registration, deletion, or changing of expense information. In the present exemplary embodiment, the expense information means information about expenses for work carried out by the person in charge at the law firm for a certain matter. A piece of expense information includes items of Type, bill status, Date, Matter, User, Billing Code, Units, rate, and Total Amount.

The item of Type indicates a charging method. For example, when the item of Type is Time, it indicates charging based on time. When the item of Type is Expense, it indicates charging based on the number of prints.

The item of bill status has a value such as Billable or Do Not Bill indicating whether charging has been carried out. The item of Matter has identification information to identify a lawsuit or a case at, for example, a law firm. The item of User indicates a person in charge of a matter.

In the present exemplary embodiment, for example, when expense information is registered by using an MFP, a value of a user who has logged in the MFP is written in this item. The item of Billing Code indicates an operation to be charged. The item of Units indicates time of expense generation when the item of Type is Time, and the number of prints or the number of print pages when the item of Type is Expense. The item of rate indicates an amount of money per unit. The item of Total Amount has a value acquired as a result of multiplying a value of the Unit item with a value of the rate item.

The external cooperation application 425 provides an interface used by, for example, the client PC 101 to issue a request to the expense management apparatus 103. For example, the external cooperation application 425 provides an interface for receiving a log-in request, a registration request of expense information, an acquisition request of user data or a matter, or a creation request of a matter, to the expense management apparatus 103.

The external cooperation application 425 notifies the main control program 421 of various requests that have been received. The main control program 421 communicates with the authentication management application 423, the expense information management application 424, and the matter management application 426 according to types of the requests to execute processing for the requests.

The matter management application 426 manages matters. Specifically, the matter management application 426 displays a screen for registering a matter by the UI application 422 of the expense management apparatus 103 that has detected a user's matter creation request, and creates matter information.

For example, information about a client of a request source of a law firm, information about a person in charge of the matter, or information about expenses for work for the matter is associated with the matter information. The expense management apparatus 103 stores information managed by the matter management application 426 in the RAM 302 of the expense management apparatus 103, and refers to the information when necessary.

[Expense Information Registration Processing Flow]

Figure 5:
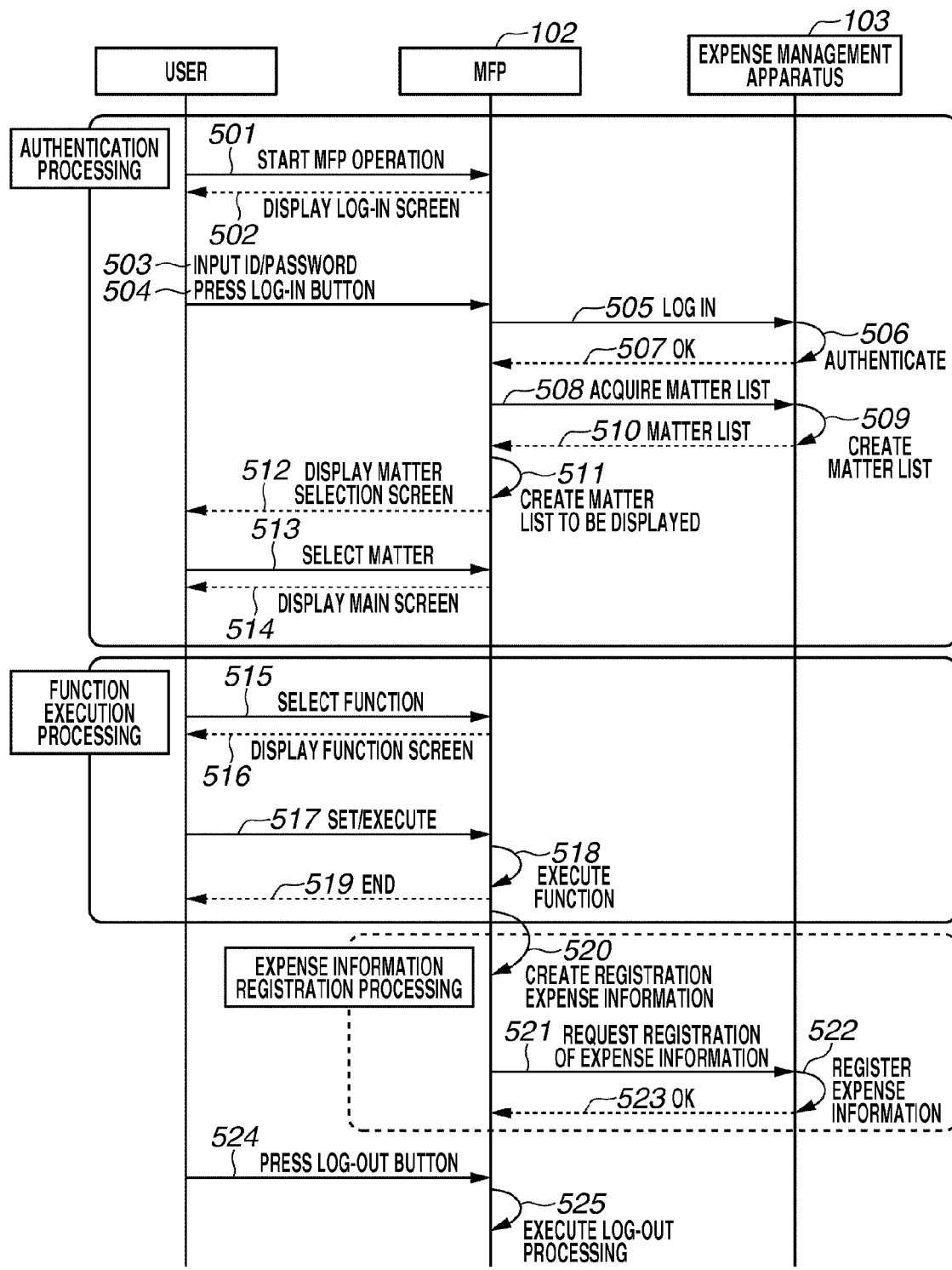
FIG. 5 is a sequential diagram illustrating processing between the MFP and the expense management apparatus in the expense management system.

Next, referring to FIG. 5, a series of processing steps from an operation start of the MFP 102 to log-out processing will be described. FIG. 5 illustrates a processing sequence between the MFP 102 and the expense management apparatus 103.

First, at the MFP 102, the user starts an operation by using the display or the hard key of the operation unit 210 to carry out processing such as copying. At that time, when the MFP is in a power-saving state, in 501, a certain button is pressed. In 502, the MFP 102 detects a button input and displays the log-in screen illustrated in FIG. 6. When the MFP is not in the power-saving state, the log-in screen illustrated in FIG. 6 has already been displayed.

FIG. 6 illustrates an example of the log-in screen of the MFP 102. On the log-in screen, areas 601 and 602 for inputting an ID and a password (identification information of user) and a list 603 for selecting a system type of a log-in target (normal log-in or expense management apparatus log-in) are displayed.

Further, a log-in button 604 for starting authentication processing according to an input content of the log-in screen and a switching button 605 for switching integrated circuit (IC) card authentication and authentication by a key input via the operation unit 210 are displayed.

In the present exemplary embodiment, one of the normal log-in and the expense management apparatus log-in can be selected as a log-in type on the log-in screen illustrated in FIG. 6. In the present exemplary embodiment, the normal log-in means logging-in to the MFP 102, while the expense management apparatus log-in means logging-in to the expense management apparatus 103.

When the normal log-in is selected, as in the case of the conventional MFP, the function of the MFP 102 can be used without creating any expense information. On the other hand, if the expense management apparatus log-in is selected, expense information regarding a matter is automatically created when the MFP 102 is used.

The processing sequence illustrated in FIG. 5 will be described on the assumption that the expense management apparatus log-in has been selected on the log-in screen illustrated in FIG. 6.

Figure 7:
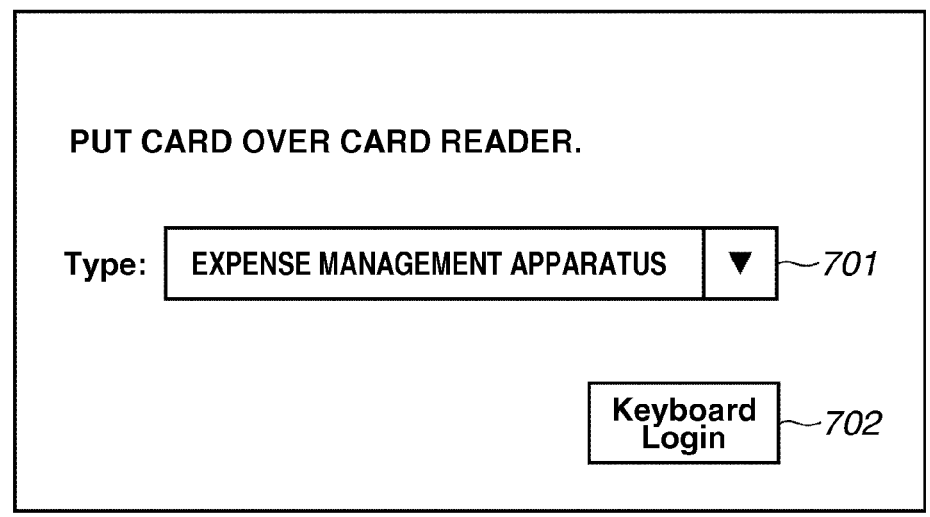
FIG. 7 is a diagram illustrating an example of a log-in screen of the MFP for executing card authentication.

FIG. 7 illustrates a screen example when an IC card is authenticated. The IC card stores an ID and a password (or only ID), which are input to the MFP 102 via a card reader (not illustrated) connected to the MFP 102.

To carry out authentication by a key input via the operation unit 210, in 503, the user inputs the ID and the password. In 504, the user presses a log-in button.

When the pressing of the log-in button is detected in the state where the normal log-in is selected on the log-in screen illustrated in FIG. 6, the authentication management application of the MFP 102 carries out authentication processing. On the other hand, when the pressing of the log-in button is detected in the state where the expense management apparatus log-in is selected on the log-in screen illustrated in FIG. 6, in 505, the MFP 102 transmits a log-in request including the ID and the password to the expense management apparatus 103.

The data transfer at this time is carried out via the network 100, and Simple Object Access Protocol (SOAP) or Representational State Transfer (REST) is used as a protocol. The data transfer operations between the MFP 102 and the expense management apparatus 103 are all carried out by the aforementioned method, and thus further description will be omitted.

In 506, after receiving the log-in request from the MFP 102, the expense management apparatus 103 acquires the ID and the password included in the log-in request and executes authentication processing. When the authentication is successful, an authentication token and an authentication result are returned to the MFP. In the communication thereafter, consistency of the authentication token is verified to check whether the authentication has correctly been carried out. In 507, the authentication result is returned to the MFP 102.

Then, in 508, the MFP 102 transmits an acquisition request of a matter list to the expense management apparatus 103.

FIG. 8 is a table illustrating an example of data stored as matter information. There are such pieces of matter information as a Matter Name 801, a Person In Charge 802, a Status 803, and Last Updated (last updated date) 804. The Matter Name 801 is a name for uniquely identifying a matter. In a list for selecting a matter, a name of this matter is displayed. The Person In Charge 802 indicates a person in charge of the matter.

The Status 803 indicates a state of the matter. In the case of Active, the matter is not ended, in other words, an active state. In the case of Closed, work for the matter has been ended. The Last Updated 804 indicates a last changing date of information about the matter. The information is updated when a file or expense information corresponding to the matter is registered.

In 509, the expense management apparatus 103 makes an inquiry about a list of matters where a log-in user is a person in charge and a status is active to the matter management application 426. In 510, the expense management apparatus 103 returns the information to the MFP 102. Concerning the list of matters transmitted for the acquisition request of the matter list by the expense management apparatus 103, all the matters can be returned without being filtered, or only the matters of a designated date and after by using the last updated can be returned.

In 511, the MFP 102 creates a list of matters acquired from the expense management apparatus 103. In 512, the MFP 102 displays the list of matters (matter selection screen) on the operation unit 210. Then, the MFP 102 receives matter selection from the user. When all the matters are acquired without filtering on the expense management apparatus 103, a list of filtered matters is created by the MFP 102, and then the matter selection screen is displayed.

Figure 9:
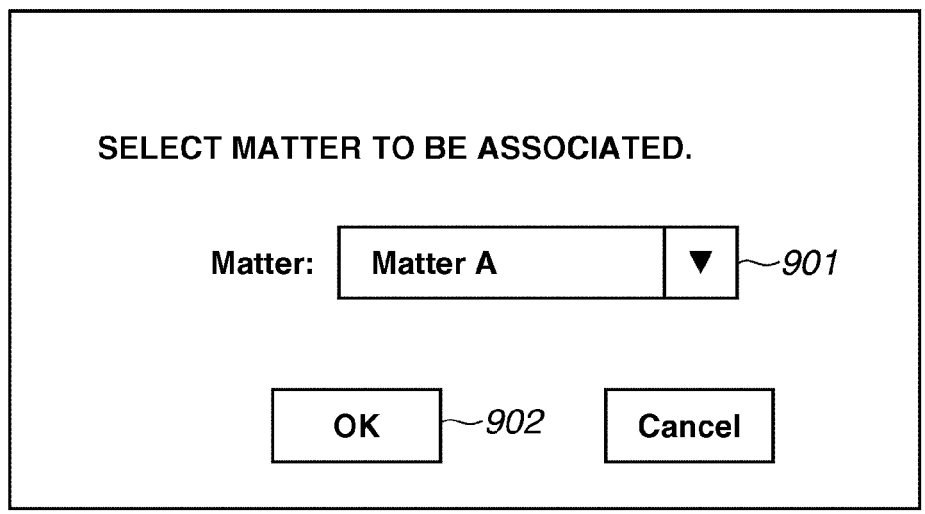
FIG. 9 is a diagram illustrating an example of a matter selection screen.

FIG. 9 illustrates an example of the matter selection screen displayed on the operation unit 210. The matter selection screen includes a list 901 for displaying the list of matters and an OK button 902 for proceeding to a next step.

In 513, the user selects a desired matter on the matter selection screen and presses the OK button. In 514, after detecting the pressing of the OK button, the MFP stores the matter selected from the list of matters, and displays a main screen (illustrated in FIG. 10). The stored matter is kept stored until log-out processing described below is carried out. Jobs executed by the MFP 102 after the matter selection are all treated as jobs associated with the matter.

Figure 10:
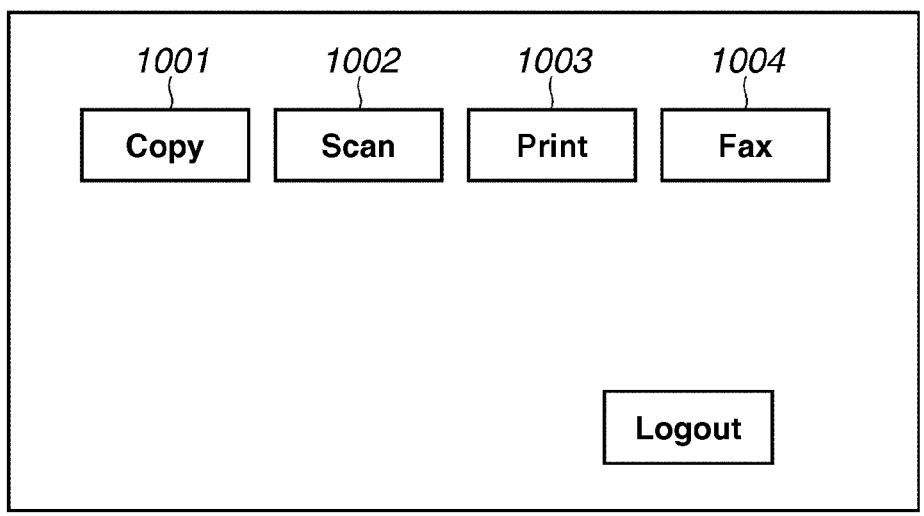
FIG. 10 is a diagram illustrating an example of a main screen (initial screen) displayed after logging-in the MFP.

FIG. 10 illustrates an example of the main screen displayed on the operation unit 210 of the MFP 102. On the main screen, a list of functions 1001 to 1004 usable by the MFP 102 is displayed. In 515, pressing of one of the buttons illustrated in FIG. 10 by a user's operation is detected. In 516, the MFP 102 calls up the corresponding function, and displays a screen of the function.

Figure 11:
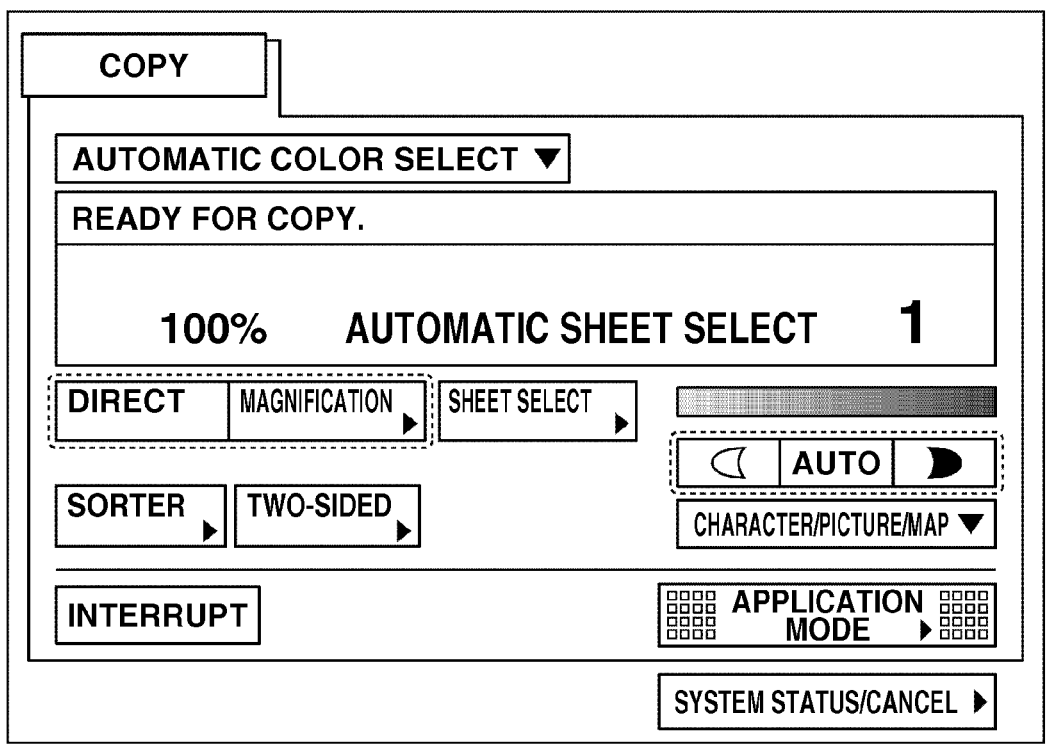
FIG. 11 is a diagram illustrating an example of a copy screen.

In the present exemplary embodiment, the MFP 102 has functions of copying, scanning, printing, and faxing. For example, when the copy function is called up, a copy screen illustrated in FIG. 11 is displayed.

In 517, the user executes various setting operations via the screen of each function, and presses a processing execution button. Then, in 518, the MFP 102 executes jobs concerning each function.

In 519, the MFP 102 executes the jobs. In 520, the MFP 102 creates expense information to be registered in the expense management apparatus 103 based on a job log or an operation log of the executed jobs. Then, in 521, the MFP 102 requests the expense management apparatus 103 to register the expense information. In 522, the expense management apparatus 103 that has received the expense information registration request registers the expense information based on the content of the received expense information. In 523, the expense management apparatus 103 returns a successfully registered status to the MFP 102.

Then, in 524, the user presses a log-out button (not illustrated) on the operation unit 210. In 525, the MFP 102 executes log-out processing. The log-out processing is carried out by the authentication management application 416. Specifically, processing for deleting the list of matters (including selected matter) acquired from the expense management apparatus 103 or processing for deleting the created expense information is executed.

The series of processes from the start of operating the MFP 102 to the log-out processing has been described.

[Authentication Processing of MFP 102]

Next, referring to FIG. 12, the authentication processing carried out at the MFP 102 will be described. This processing corresponds to the processing of the MFP 102 illustrated as the authentication processing portion in FIG. 5.

Each software of the MFP 102 is rasterized in the RAM 202 by the CPU 201 of the MFP 102 to execute each processing.

First, in step S1201, after detecting a user's operation, the UI application 411 displays the log-in screen illustrated in FIG. 6 on the operation unit 210. Specifically, in step S1202, when detecting user's pressing of the log-in button on the log-in screen, the UI application 411 notifies the authentication management application 416 of this.

In step S1203, the authentication management application 416 checks a selection state of the log-in type. There are two log-in types: normal log-in for using the function of the MFP 102 without registering any expense information, and expense management apparatus log-in for registering information of expenses (expense information) generated by using the MFP 102 in the expense management apparatus 103.

When the normal log-in is selected (NO in step S1203), in step S1204, the MFP 102 executes authentication processing by using authentication information stored in the ROM 203. Specifically, in step S1205, the authentication management application 416 verifies whether authentication information coincident with a combination of an ID and a password acquired via the log-in screen is present in the authentication information of the ROM 203. When coincidence with the combination of the ID and the password is determined (YES in step S1205), in step S1212, the CPU 201 of the MFP 102 stores current time measured by the RTC 214 as an operation log of log-in time in the RAM 202.

Figure 13:
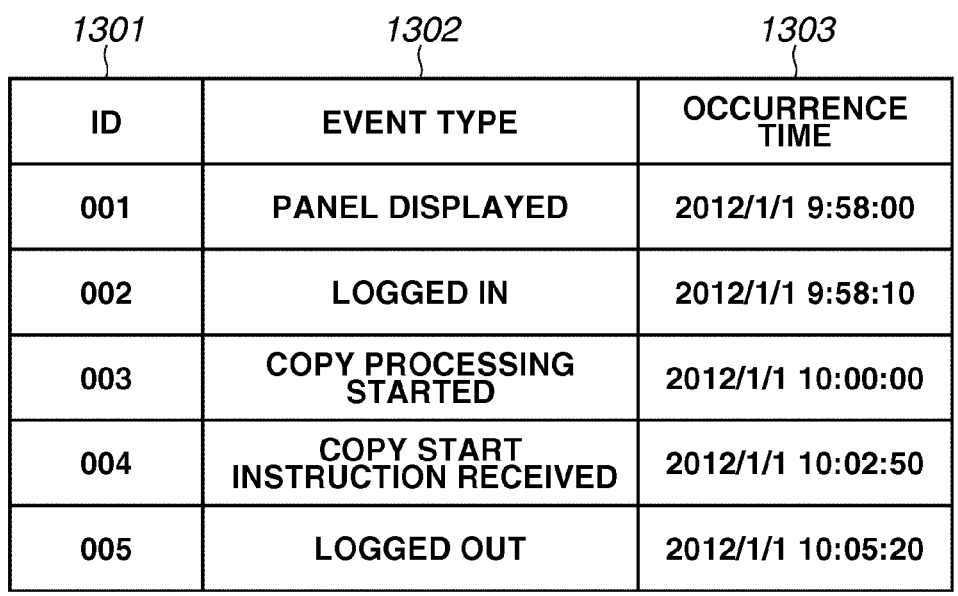
FIG. 13 is a table illustrating an example of data of an operation log at the MFP.

FIG. 13 illustrates an example of an operation log managed by the authentication management application 416.

The authentication management application 416 stores the current time as an operation log in the RAM 202 at a certain operation timing. For example, the timing is when the user starts an operation at the MFP 102 to display the log-in screen, when the user logs in the MFP 102 or the expense management apparatus 103, when an operation start of each function is detected, or when the user logs out from the MFP 102 or the expense management apparatus 103.

An ID 1301 is an identifier for uniquely indicating each record of the operation log. In an event type 1302, a value indicating at what timing the operation log has been stored is stored. In an occurrence time 1303, occurrence time of a relevant event is stored.

Then, in step S1213, the main control program 415 requests displaying of the main screen to the UI application 411, and displays the main screen illustrated in FIG. 10 on the operation unit 210. When no coincidence with the combination of the ID and the password is determined (NO in step S1205), the processing returns to the log-in screen to prompt inputting again.

When the selection state of the log-in type is the expense management apparatus log-in (YES in step S1203), in step S1206, the authentication management application 416 instructs the expense management cooperation application 417 to transmit the ID and the password acquired from the log-in screen as a log-in request to the expense management apparatus 103.

The expense management cooperation application 417 that has received the instruction transmits the log-in request including the ID and the password to the expense management apparatus 103. At that time, a protocol represented by SOAP or REST is used. However, other methods can be used. Authentication data is transferred by using a method represented by BASIC authentication or Digest Authentication.

In step S1207, after a log-in response has been returned as an authentication result from the expense management apparatus 103 to the MFP 102, the authentication management application 416 checks the authentication result. When the authentication result is a value indicating an authentication success (YES in step S1207), the authentication management application 416 stores an authentication token included in the authentication result, and processing from step S1208 is continued. When the authentication result is a value indicating an authentication failure (NO in step S1207), in step S1201, the processing returns to the log-in screen to prompt inputting again.

In step S1208, when the authentication is successful, the authentication management application 416 causes the expense management apparatus 103 to transmit a matter list acquisition request. Then, in step S1209, the authentication management application 416 creates a list of matters to be displayed by using the matter list acquired from the expense management apparatus 103.

The list of matters to be created can be all the matters acquired from the expense management apparatus 103 or filtered by the Person In Charge 802, the Status 803, or the Last Updated 804.

After the creation of the list of matters in step S1209, the authentication management application 416 requests displaying of the matter selection screen to the UI application 411. In step S1210, the UI application 411 that has received the request displays the matter selection screen illustrated in FIG. 9 on the operation unit 210. The list of matters created in step S1210 is a list to be displayed on the matter selection screen. In the list, Matter Names are enumerated.

For the list of matters, an interface capable of changing a filtering method using the person in charge or the status can be displayed on the matter selection screen. In this case, in step S1209, when the filtering method is changed, a list of matters is created again.

The order of displaying is basically the order of acquisition. The data can be sorted by last updated, or sorted based on its information by storing a last reference date on the expense management apparatus 103 side.

In step S1211, the authentication management application 416 that has detected the pressing of the OK button 902 stores a Matter Name selected from the list of matters.

Then, in step S1212, the authentication management application 416 stores current time counted by the RTC 214 as a log-in operation log in the RAM 202. Then, in step S1213, the UI application 411 displays the main screen illustrated in FIG. 10 on the operation unit 210 and ends the processing illustrated in FIG. 12.

[Copy Execution Processing of MFP 102]

Figure 14:
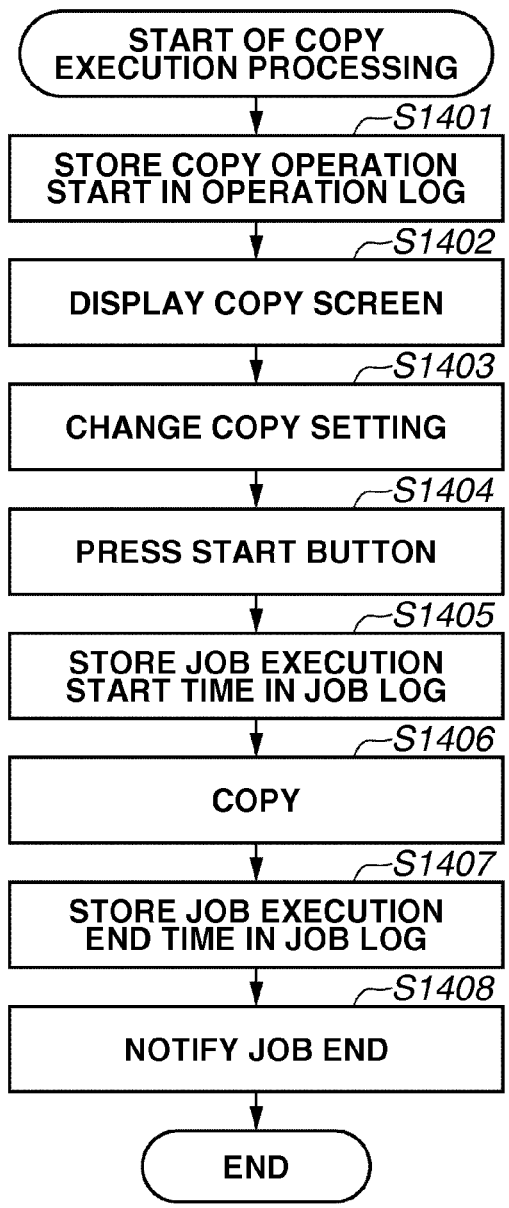
FIG. 14 is a flowchart illustrating an example of copy processing executed by the MFP.

FIG. 14 is a flowchart illustrating processing when the copy function of the MFP 102 is executed. The processing illustrated in FIG. 14 corresponds to that of step S516 illustrated in FIG. 5.

Important steps are storage of an operation log (performed in steps S1401 and S1405) and storage of a job log (performed in step S1407). These logs are used in expense information registration processing carried out after execution of each function. The execution processing of each function is similar between the normal log-in and the expense management apparatus log-in. However, operation log storage or the like may be executed only in the case of the expense management apparatus log-in.

The processing of the flowchart of FIG. 14 is started from the displayed state of the main screen illustrated in FIG. 10 on the operation unit 210 of the MFP. The main control program 415 calls up the copy application 412 when it detects pressing of the execution button 1001 of the copy function on the main screen.

First, in step S1401, the copy application 412 stores the time (when copy application 412 is called up) as copy processing start time (start time) in an operation log illustrated in FIG. 13. Then, in step S1402, a copy screen illustrated in FIG. 11 is displayed on the operation unit 210.

The user executes, on the copy screen, setting concerning copying, such as the number of copies, copy magnification, a sheet size, a density, or a sheet type. In step S1403, the copy application 412 changes the copy setting according to a user's input from the operation unit 210, and updates the copy screen to the set content.

In step S1404, the copy application 412 detects an input indicating a copying start. In step S1405, the copy application 412 stores time of detecting the input of the copying start as a log of Job Execution Start Time 1503 in the HDD 205.

In step S1406, the MFP 102 executes a copy job. In the present exemplary embodiment, the copy job indicates processing from a start of document scanning to an end of outputting of an image to a medium such as paper.

In step S1407, after ending the copy job, the copy application 412 instructs the log management application 418 to store contents of the processing as a job log. The log management application 418, which has received the instruction from the copy application 412, stores a job log indicating ending of the execution of the job log in the HDD 205.

FIG. 15 is a table illustrating the contents of the job log managed by the log management application 418. The job log illustrated in FIG. 15 is stored in the HDD 205 of the MFP 102.

The job log includes items such as a job ID 1501, a Job Type 1502, a Job Execution Start Time 1503, a Job Execution End Time 1504, a Status 1505, an Execution User 1506, a Number Of Pages 1507, a Number Of Sheets 1508, and a Detailed Setting 1509.

The job ID 1501 is an identifier for uniquely indentifying a job. The Job Type 1502 is a type of an executed function. Types are, for example, copying, scanning, printing, and facsimile transmission. The Job Execution Start Time 1503 is the time of starting execution of a job.

The job execution end time 1504 indicates the end time of the execution of the job (end time). The Status 1505 indicates a state of the job. Specifically, a value of 1504 is stored as completed when the execution of the job is normally ended, and as failed when the execution is a failure for a certain reason. The Execution User 1506 stores the log-in user.

In the Number Of Pages 1507, the number of pages of copied sheets is stored. When two copies of three pages are stored, it makes six pages. When two sides are copied, two pages are printed on one sheet.

In the Number Of Sheets 1508, the number of output sheets is stored. When two copies of three pages are one-sided copied, it makes six pages. When two sides are copied, it makes four because one copy uses two.

In the Detailed Setting 1509, color setting, one-sided or two-sided setting, and magnification setting are stored. Each item is stored in a format to facilitate subsequent acquisition of each setting value, for example, to achieve "setting name"="setting value". These items are collected as one in the detailed setting. However, each item can be independently stored.

In step S1408, after ending the storage processing of the job log, the copy application 412 transmits a job end notification to the main control program 415 or the authentication management application 416.

In the present exemplary embodiment, the copy function is described as an example. The processing is similar to that of the functions other than the copying, such as scanning, printing, facsimile transmission. In such a case, processing of a screen display portion, a setting portion, and a function execution portion is based on each function. Storage of an operation log is basically carried out at the start time and the execution instruction time of each function, and storage of a job log is carried out at the end time of each processing.

When an error such as paper jamming during copying occurs, an error flag indicating error generation and error releasing can be stored.

[Expense Information Registration Processing of MFP 102]

Figure 16:
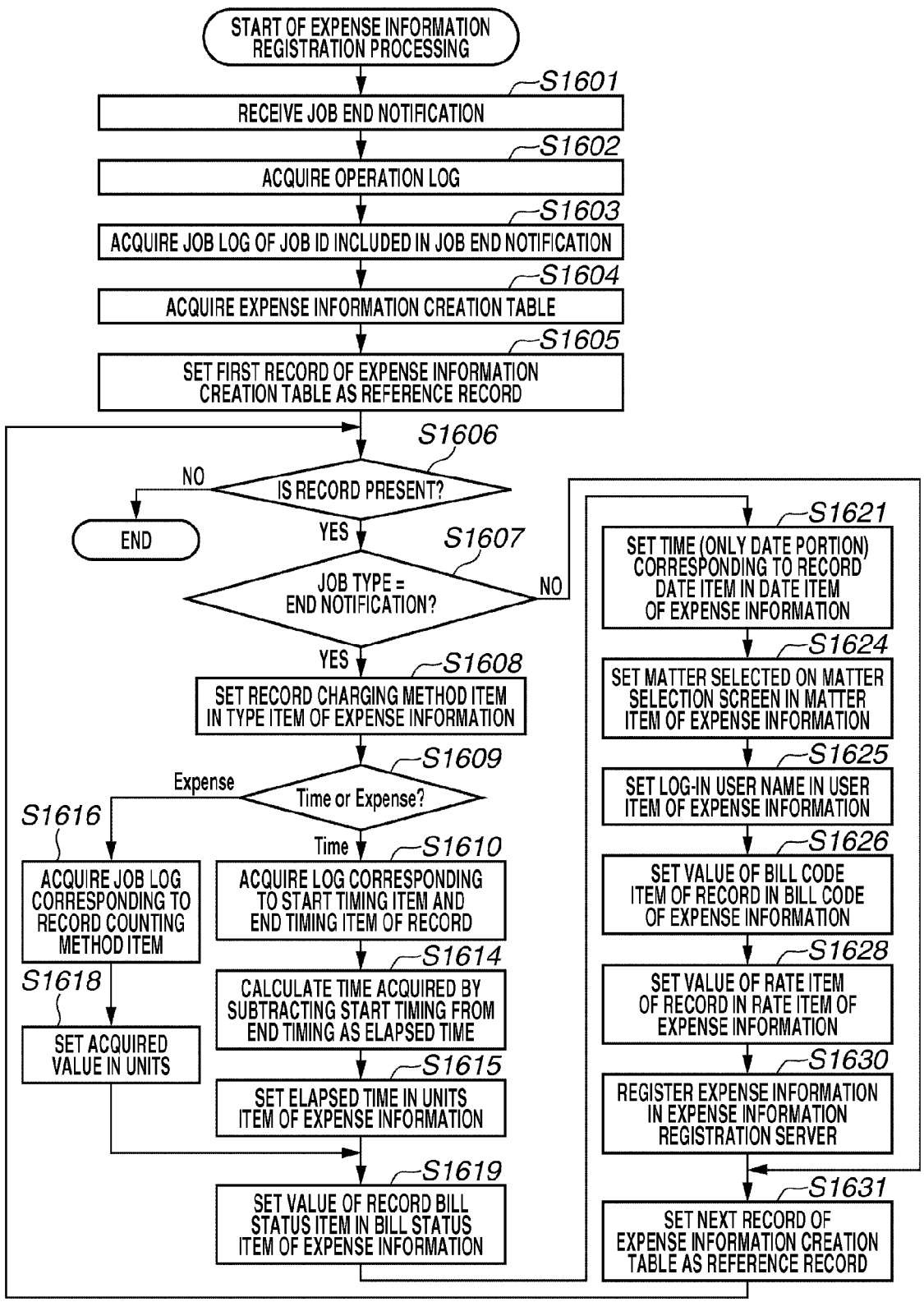
FIG. 16 is a flowchart illustrating an example of expense information registration processing executed by the MFP.

FIG. 16 is a flowchart illustrating an example of expense information registration processing executed after executing each function of the MFP 102.

The processing illustrated in FIG. 16 corresponds to that of the MFP 102 described in a broken line of the expense information registration illustrated in FIG. 5. In the flowchart of FIG. 16, the processing is started by receiving a job end notification from each application when the execution of the job is ended.

First, in step S1601, the authentication management application 416 receives a job end notification from the copy application 412, the print application 414, or the facsimile application 413. The job end notification includes a job type indicating which of the functions (copying, printing, and facsimile transmission in the present exemplary embodiment) of the MFP 102 has been used for notification, and a job ID for uniquely identifying a job.

The authentication management application 416, which has received the job end notification, requests the log management application 418 to acquire an operation log. In step S1602, the log management application 418 acquires the operation log and returns it to the authentication management application 416. Further, in step S1603, the authentication management application 416 acquires a job log coincident with the job ID included in the job end notification received in step S1601, and sets it as a job log of an expense information creation target.

Then, in step S1604, the authentication management application 416 reads and acquires an expense information creation table for registering expense information in the expense management apparatus 103 from the RAM 202 or the HDD 205. The expense information creation table has been stored beforehand in the RAM 202 or the HDD 205 of the MFP 102 by the authentication management application 416 based on a user's input. The expense information creation table is input by the user via a screen illustrated in FIG. 18 described below.

FIG. 17 illustrates an example of the expense information creation table acquired in step S1604. The expense information creation table includes at least one or more records. One record includes a Job Type 1701, a Charging Method 1702, a Bill Status 1703, a Start Timing 1704, an End Timing 1705, a Counting Method 1706, a Date 1707, a Billing Code 1708, a Rate 1709, and a Condition 1710.

In the item of the Job Type 1701, a value indicating a type of a job (Copy, Print, or Fax) for registering expense information is stored. In the case of Copy, the expense information is registered when copying is executed. In the case of Fax, the expense information is registered when facsimile transmission is executed. In the present exemplary embodiment, a charging method varied based on used functions can be employed.

In the item of the Charging Method 1702, a value indicating what charging is based on is stored. In the present exemplary embodiment, there are Time and Expense. In the case of Time, expense information is created by using elapsed time. In the case of Expense, expense information is created by using the number of printed pages or the number of sheets. In the case of Time, what basis is used for the start timing and the end timing is set. In the case of Expense, which of the number of pages and the number of sheets is used for counting is set as a counting method.

In the item of the Start Timing 1704, a value indicating processing timing for starting measurement of the elapsed time, when a charging method is Time, is stored. For the Start Timing 1704, in addition to a copy processing start (time of detecting execution of coy job), various values such as the time of displaying the copy screen and the time of logging-in can be set.

In the item of the End Timing 1705, a value indicating processing timing for ending measurement of time when a charging method is Time is stored.

Values usable for the start timing and the end timing are the times stored in the job log illustrated in FIG. 15 or the operation log illustrated in FIG. 13. For example, when a copy processing start is set in the Start Timing 1704, the copy processing start time stored in the operation log is set as start timing.

When a copy end time is set in the End Timing 1705, the job execution end time 1504 of the job log is set as the end timing. A value of end time–start time is elapsed time.

On the other hand, when a charging method is Expense, values of the start timing and the end timing are null, and instead a value is set in the Counting Method 1706.

In the Counting Method 1706, a value indicating an item used when the charging method is Expense is stored. A value that can be employed is the number of pages or the number of sheets. When the charging method is Time, a value of the counting method is null.

In the item of the Bill Status 1703, a setting value as to whether to charge is stored. There are three types: Billable, Do Not Bill, and No Charge.

In the item of the Date 1707, a value used as a date of executing an operation to be charged is stored. The same value as that of the start timing or the end timing can be used.

In the item of the Billing Code 1708, a value indicating an operation to be charged is stored. A type of the Billing Code is selected from those acquired from the expense management apparatus 103. The authentication management application 416 sets a Billing Code corresponding to a function of the MFP 102 based on a user's input.

In the item of the Rate 1709, an amount of money to be charged per unit is stored. When the charging method is Time, for example, an amount of money per minute is set. When the charging method is Expense, for example, an amount of money per page or sheet is set.

In the item of the Condition 1710, a condition of applying its record is stored. When there is no condition (when the item is empty), all operations of coincident types are targets of registering expense information. In this case, a conditional expression, for example, data is registered when a color mode is color, can be written. Accordingly, in a case of color output, an amount of money per page can be set high, or an amount of money per unit time can be changed according to a facsimile transmission/reception line.

In a case of setting where a plurality of data is registered by the same job type or the same charging method, priority is set among conditions, and only those high in priority are registered. Alternatively, a plurality of the conditions can be registered.

In step S1605, after acquiring the expense information creation table, a first record is extracted from the expense information creation table to be set as a reference record.

Then, in step S1606, the MFP 102 determines whether the value of the reference record acquired in step S1605 is present. When not present (NO in step S1606), the processing is ended without registering any expense information in the expense management apparatus 103. On the other hand, when the value of the reference record is present in the expense information creation table (YES in step S1606), the processing proceeds to step S1607 to create expense information to be registered in the expense management apparatus 103.

When the Job Type 1701 of the expense information creation table coincides with the job type of the job end notification received in step S1610, the MFP 102 determines that expense information to be registered in the expense management apparatus 103 is created (YES in step S1607), and the processing proceeds to step S1608. When the Job Type 1701 does not coincide with the job type of the job end notification (NO in step S1607), in step S1631, the MFP 102 extracts, without executing registration processing based on the reference record, a next record from the expense information creation table, and the record is set as a new reference record.

The expense information includes Type, Billing Status, Date, Matter, User, Billing Code, Units, and Rate, and these values are set by using values of the operation log, the job log, and the expense information creation table.

In step S1608, in the Type of the expense information, the value of the Charging Method 1702 of the reference record is directly set.

Then, in step S1609, the MFP 102 checks which of Time and Expense the Type of the reference record is. In the case of Time, in step S1610, the MFP 102 first acquires values of the Start Timing 1704 and the End Timing 1705 of the reference record. For the value of the start timing acquired in this case, as described above, a value such as a copy job start time, a copy screen display time, or a log-in time is set. For the value of the end timing, a value such as a copy job end time or a log-out time is set.

Then, the MFP 102 refers to the operation log and the job log acquired in steps S1602 and S1603 to determine times corresponding to the values of the Start Timing 1704 and the End Timing 1705 acquired in step S1610 as the counting start time and the counting end time. In step S1614, the MFP 102 calculates a time period acquired by subtracting the counting start time from the counting end time as an elapsed time. Then, in step S1615, the value calculated in step S1614 is set in the item of the Units of the expense information to be registered in the expense management apparatus 103.

In other words, when the item of the Type of the reference record is Time, values calculated in steps S1610 to S1613 are set in the items of the Units.

On the other hand, when the Type of the reference record is Expense, in step S1616, a value of the Counting Method 1706 of the reference record is acquired. In the value of the Counting Method 1706, as described above, at least one of the values of the number of pages and the number of sheets is set. The authentication management application 416 determines to count the expense information by the number of pages or the number of sheets according to this value.

Then, in step S1618, the MFP 102 refers to the job log acquired in step S1603 to acquire a value corresponding to the value of the Counting Method 1706, and sets the value in the item of the Units of the expense information. In other words, when the Counting Method 1706 indicates the number of pages, the number of pages of the job log of the job for which the job end notification has been received is directly set in the value of the Units of the expense information.

Then, in step S1619, the MFP 102 acquires a value of the Bill Status 1703 of the reference record, and sets the acquired value in the value of the item of the bill status of the expense information.

Then, the MFP 102 acquires a value of the Date 1707 of the reference record, and refers to the job log or the operation log corresponding to the value, and sets time. In the job log or the operation log, not only information about date but also information about hour and minute are recorded. In this case, however, in step S1621, only the information about the date is extracted and set in the item of the Date of the expense information.

In step S1624, in the item of the Matter of the expense information, the Matter Name selected by the user on the matter selection screen illustrated in FIG. 9 and managed by the authentication management application 416 is set.

In step S1625, in the item of the User of the expense information, the name of the log-in user stored in the authentication management application 416 is set.

In step S1626, a value of the Billing Code 1708 of the reference record is acquired. In step S1627, the value is set in the Billing Code of the expense information.

In step S1628, a value of the Rate 1709 of the reference record is acquired. In step S1629, the value is set in the Rate of the expense information.

Then, in step S1630, the authentication management application 416 transmits the expense information generated through steps S1608 to S1629 to the expense management apparatus 103 via the expense management apparatus cooperation application 417. The expense information is transmitted via the network interface 206 and the network 100 using protocol such as SOAP or REST.

Then, the next record is extracted and set as a new reference record. The processing of steps S1606 to S1630 is carried out for all the records of the expense information creation table.

The series of processes from the start of the operation at the MFP 102 to the registration of the expense information in the expense management apparatus 103 has been described. According to the present exemplary embodiment, the expense information to be registered in the expense management apparatus 103 can be automatically generated by the MFP 102. This enables easy management of expenses (printing fees for copying, fees based on occupation time of MFP 102 during copying, and labor costs of person in charge of copying at law firm) generated due to the operation of the MFP 102.

The expense information to be registered in the expense management apparatus 103 is created according to the expense information creation table illustrated in FIG. 17. Thus, the expense information can be created base on an operation policy in an environment of managing expenses.

Further, according to the present exemplary embodiment, since the expense information varied based on the function (copying, printing, and facsimile transmission) of the MFP 102 is created, more meticulous expense information can be created.

FIG. 18 illustrates a screen example for setting the expense information creation table.

The screen illustrated in FIG. 18 is displayed by accessing a predetermined uniform resource locator (URL) of the MFP 102 from a web browser of an external terminal such as the client PC 101 or a mobile terminal (not illustrated). This URL is for adding/editing records in the expense information table, and described in a form of "http://[host name or Internet Protocol (IP) address of MFP 102]/[data path]/[file name]".

A web server (not illustrated) of the MFP 102 that has received an access from the external terminal (client PC 101 or the like) requests the authentication management application 416 to generate data. The authentication management application 416 that has received the request generates HTML data and transmits it to the client PC 101. As a result, the screen illustrated in FIG. 18 is displayed on the display of the client PC 101. A screen similar to that illustrated in FIG. 18 can be displayed on the operation unit 210 of the MFP 102.

As illustrated in FIG. 18, items making pairs with the contents stored in the expense information creation table illustrated in FIG. 17 are displayed on the display of the client PC 101. Data input by selecting or editing a value by the user is transmitted to the web server in the MFP 102. The authentication management application 416 that has received the data changes the contents of the expense information creation table.

FIG. 19 illustrates a screen example of a list of expense information stored in the expense management apparatus 103.

The screen illustrated in FIG. 19 is displayed by accessing a predetermined URL of the expense management apparatus 103 from the web browser of the client PC 101 or the mobile terminal (not illustrated). This URL is for displaying the list of expense information, and described in a form of "http://[host name or IP address of expense management apparatus 103]/[data path]/[file name]".

The expense management apparatus 103 that has received the request of accessing the URL for displaying the list of expense information (HTTP request message) transmits the received request to the main control program 415. The main control program 415 requests data of the expense information managed by the expense information management application 424, and converts the acquired data of the expense information into HTML data, and returns it to the request source. The web browser at the request source analyzes the HTML data, and displays a screen of a web page illustrated in FIG. 19.

Next, the expense information registration processing will be described using an example of a real value.

For example, a creation method of expense information when a log-in user as User 1 selects a Matter A, executes copying at the MFP 102, generates the operation log illustrated in FIG. 13 and the job log illustrated in FIG. 15, and uses the registration setting table illustrated in FIG. 17 will be described.

First, the authentication management application 416 checks whether a job type coincident with a job type for which a job end notification has been received is present in the expense information creation table. Since the type of the job end notification is copy, a type where the Job Type 1701 of the expense information creation table is Copy is searched for. Then, records of a first row and a second row match each other. By using information of the records, each item of the expense information is set. First, the first row of the expense information creation table is used.

In Type of the expense information, time is designated to set a Charging Method 1702 of the expense information creation table.

In the Bill Status of the expense information, Billable is designated to set the Bill Status 1703 of the expense information creation table.

In an item of Date of the expense information, date of processing written in the expense information creation table is set. Specifically, only a time date portion of a copy processing start in the operation log is designated. Accordingly, 2012/1/1 that is a date portion of 2012/1/1 10:00 is designated.

In the Matter of the expense information, Matter A is designated to set a Matter Name stored during the authentication in step S1211.

In the User of the expense information, User 1 is designated to set the authenticated user.

In the Billing Code of the expense information, Copy is designated to set the Billing Code 1708 of the expense information creation table.

In the Units of the expense information, time indicating generation of expenses is designated when the Type item is Time, and the number of printed sheets or the number of pages is designated when the Type item is Expense.

In this example, in the Units of the expense information, a value acquired by subtracting the copy processing start time from the log end time is set. Accordingly, 5.0 acquired by subtracting 2012/1/1 10:00:00 from 2012/1/1 10:05:00 is designated. When the operation log includes information indicating an error generated during copying, the time period acquired by subtracting the error generation time from the error releasing time can be set in the Units.

In the Rate of the expense information, 1 is designated to set the Rate of the expense information creation table.

Then, the second expense information is generated by using information of the second row of the expense information creation table. Since the charging method is Expense, the method is similar to that of the first row except use of the number of pages of the job log in the Units, and thus description thereof is omitted.

The configuration where the expense information creation table is stored in the MFP 102 has been described. However, a configuration where the expense management apparatus 103 stores the expense information creation table and, in step S1604, the expense information creation table is acquired from the expense management apparatus 103 can be employed.

The first exemplary embodiment has been described. The first exemplary embodiment employs the configuration where one of the normal log-in and the expense management apparatus log-in is selected as the Login Type on the log-in screen illustrated in FIG. 6. When the expense management apparatus log-in is selected as the Login Type, the MFP 102 can be used after logging in the expense management apparatus 103. In other words, a signal sign-ON mechanism can be used. This provides an advantage in that authentication does not need to be carried out repeatedly.

The first exemplary embodiment has been directed to the configuration where the logging-in processing is carried out on the screen illustrated in FIGS. 6 to 9. The first exemplary embodiment is advantageous in that there is no need to carry out any authentication operation at the MFP 102 when authentication is successful at the expense management apparatus 103. However, to carry out operations for a plurality of Matters, the processing must first log out from the MFP 102, and then must be repeated from authentication.

On the other hand, a second exemplary embodiment employs a configuration where authentication is carried out at the MFP 102 and then, to register expense information, authentication and matter selection are carried out at an expense management apparatus 103 when a separately installed expense information registration function is called up.

Second Exemplary Embodiment

Hardware Configuration and Software Configuration

The hardware configuration and the software configuration are similar to those of the first exemplary embodiment. Thus, detailed description thereof will be omitted.

Second Exemplary Embodiment

Expense Information Registration Flow

Figure 20:
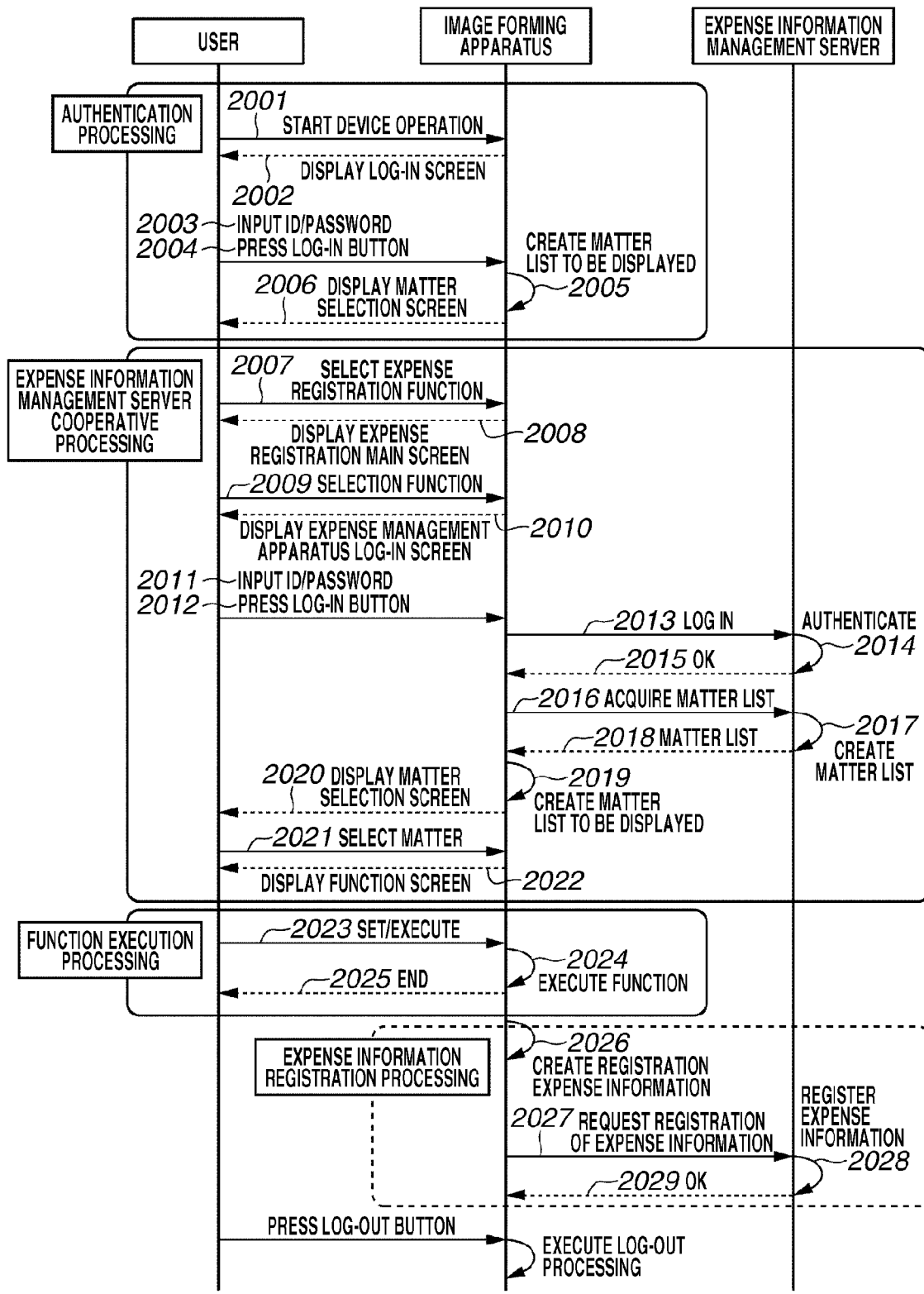
FIG. 20 is a sequential diagram illustrating processing between a MFP and an expense management apparatus in an expense management system according to a second exemplary embodiment.

Referring to FIG. 20, a series of processes from an operation start of the MFP 102 to expense registration in the expense management apparatus 103 according to the second exemplary embodiment will be described.

First, to carry out processing such as copying, a user starts an operation by using a display and a hard key of an operation unit 210 of the MFP 102. At this time, in 2001, the user presses a certain button when the MFP 102 is in a power saving state. Then, in 2002, the MFP 102 detects an input to display a log-in screen. When the MFP 102 is not in the power saving state, the log-in screen has already been displayed.

Figure 21:
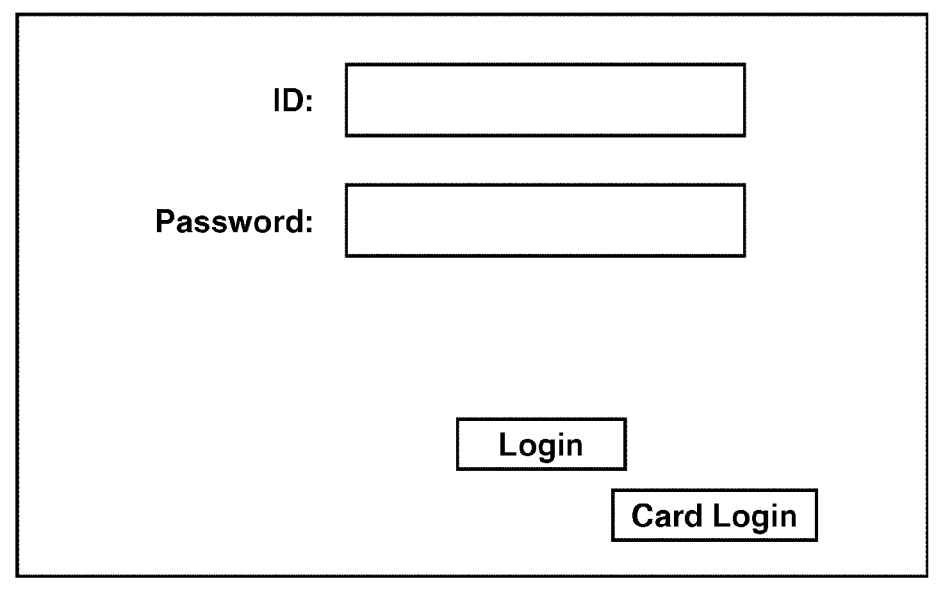

FIG. 21 illustrates an example of the log-in screen according to the second exemplary embodiment. The difference from the first exemplary embodiment is that there is no list for selecting a system type of a logging-in target. In the second exemplary embodiment, first, authentication processing is carried out using an authentication function of the MFP 102.

In 2003, the user inputs an ID and a password on the log-in screen. In 2004, the user presses a log-in button indicating a start of the authentication processing. In 2005, after detecting the pressing of the log-in button, the MFP 102 collates the ID and the password acquired from the log-in screen with authentication information stored in a RAM 202 in the MFP 102, and executes authentication.

In 2006, if the authentication has been successful, a main screen is displayed. The authentication processing performed in 2005 is for logging in only to the MFP 102. Thus, at this time, no log-in request is issued to an expense management apparatus.

Figure 22:
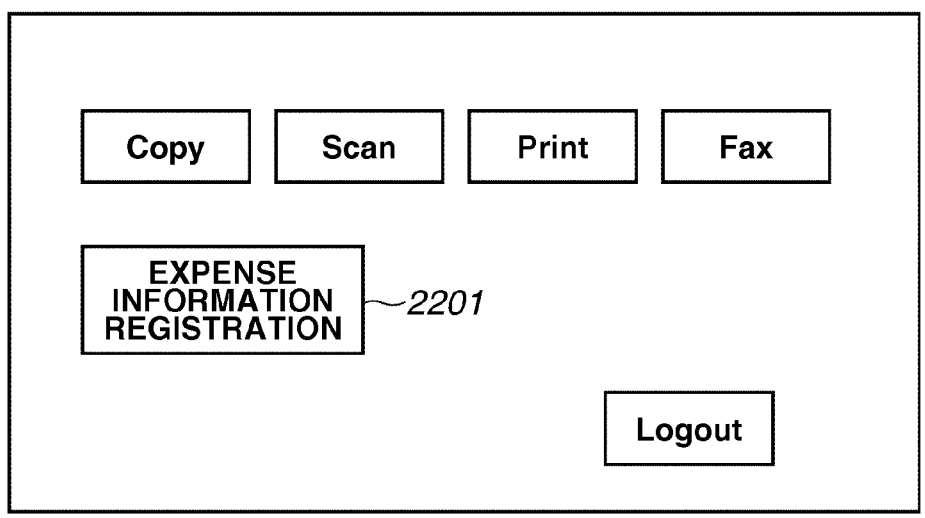
FIG. 22 is a diagram illustrating an example of a main screen when a user logs in the MFP according to the second exemplary embodiment.

FIG. 22 illustrates an example of the main screen according to the second exemplary embodiment.

Then, in 2007, the user presses an expense information registration button. The MFP 102 detects the pressing of the expense information registration button 2201. In 2008, the MFP 102 displays an expense information registration main screen.

Figure 23:
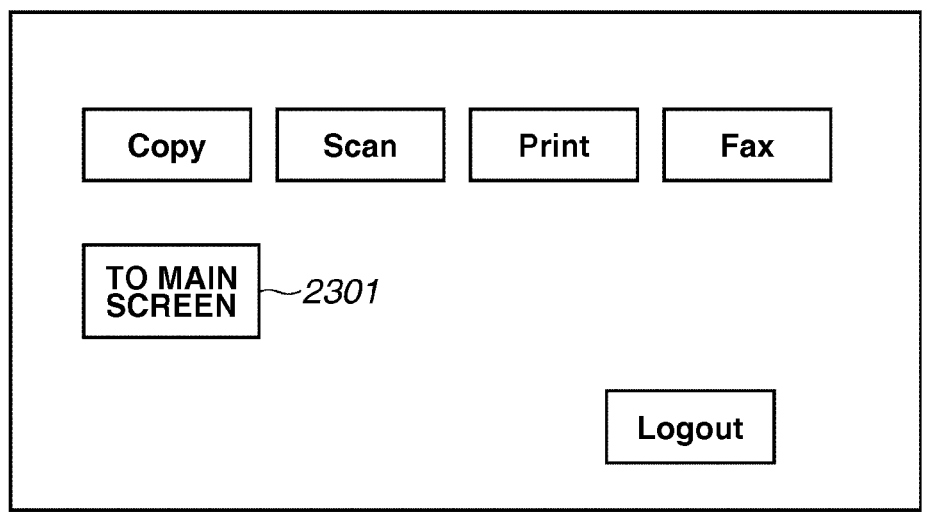
FIG. 23 is a diagram illustrating an example of a main screen (expense management apparatus log-in screen) when the user logs in the expense management apparatus according to the second exemplary embodiment.

FIG. 23 illustrates an example of the expense information registration main screen according to the second exemplary embodiment. On the expense information registration main screen, there are buttons for starting execution of corresponding functions and a button 2301 for returning to the main screen.

In 2009, the user presses a button of a function to be executed on the expense information registration main screen illustrated in FIG. 23. As illustrated in FIG. 23, the button of the function is a Copy button, a Scan button, a Print button, or a Fax button. When one of these buttons is pressed, a corresponding application is activated to set an executable state of a predetermined function.

In 2010, the MFP 102, which has detected the pressing of the button of each function, displays the log-in screen for inputting an ID and a password to log in the expense management apparatus 103. The displayed log-in screen is as illustrated in FIG. 21. However, there is a difference in that the log-in screen displayed in 2010 is for logging in the expense management apparatus 103 while the log-in screen displayed in 2002 is for logging in the MFP 102.

The second exemplary embodiment has a feature that when one of the Copy button, the Scan button, the Print button, and the Fax button is pressed on the screen illustrated in FIG. 23, the log-in screen for logging in the expense management apparatus 103 is displayed.

In 2011, the user inputs an ID and a password of the expense management apparatus 103. In 2012, the user presses a log-in button indicating a start of authentication processing.

In 2013, the MFP 102 transmits a log-in request including the ID and the password to the expense management apparatus 103. After transmitting the log-in request in 2013, in 2014, the expense management apparatus 103 acquires the ID and the password included in the log-in request and carries out authentication processing. When the authentication is successful, an authentication token and an authentication result are returned to the MFP 102.

Then, in 2016, the MFP 102 transmits an acquisition request of a matter list to the expense management apparatus 103.

After receiving the acquisition request in 2016, in 509, the expense management apparatus 103 makes an inquiry about a list of matters where the user authenticated in 2014 is a person in charge and status is active, to a matter management application 426. Then, in 510, the expense management apparatus 103 returns the list of matters acquired as a result of the inquiry to the MFP 102.

Concerning the list of matters returned by the expense management apparatus 103 in response to the acquisition request of the matter list, all the matters can be returned without filtering, or only matters of a date designated by using Last Updated and after can be returned.

In 2020, the MFP 102 displays the matter list acquired from the expense management apparatus 103 as a matter selection screen on the operation unit 210. When all the matters are acquired without filtering on the expense management apparatus 103 side, the MFP 102 creates a list of filtered matters, and then the matter selection screen is displayed. After the matter selection screen has been displayed, in 2021, a matter selected by the user on the matter selection screen is received and stored in the RAM 202.

In the first exemplary embodiment, the matter stored in the RAM 202 is deleted after the execution of the log-out processing. On the other hand, in the second exemplary embodiment, the matter is deleted after the pressing of the function button, and can be rewritten with another matter.

Specifically, for example, it is supposed that the user presses the Copy button on the expense registration main screen illustrated in FIG. 23 to carry out a copy job. Then, returning to the expense registration main screen illustrated in FIG. 23, the user presses the Print button. At this time, according to the second exemplary embodiment, in 2021, the matter selection screen is displayed, allowing the matters to be changed.

A matter A can be selected when the copy job is executed, and a matter B can be selected when the print job is selected. As a result, different from the first exemplary embodiment, advantageously, the matters can be changed without executing log-out processing first.

In 2010, on the screen illustrated in FIG. 20, the screen for logging in the expense management apparatus 103 is displayed for each selection of the function button on the expense registration main screen. However, the expense management apparatus log-in screen can be displayed only when the button is first pressed on the expense registration main screen illustrated in FIG. 23, and thereafter the expense management apparatus log-in screen can be displayed.

Processing of steps 2023 to 2029 is similar to that of steps S16 to S25 illustrated in FIG. 5, and thus description thereof will be omitted.

Second Exemplary Embodiment

Authentication Processing of MFP 102

Figure 24:
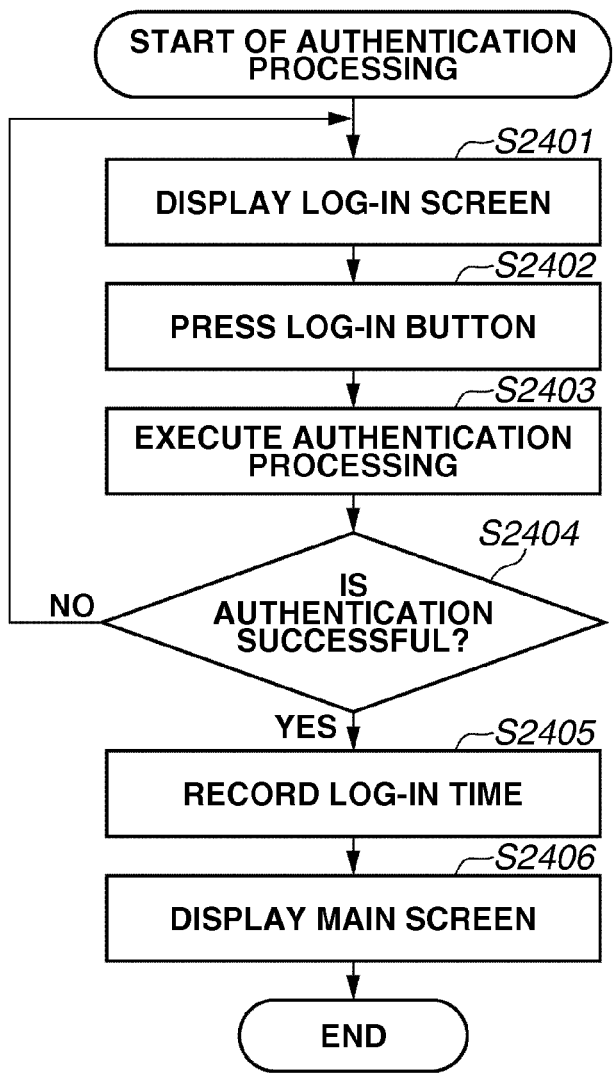
FIG. 24 is a flowchart illustrating an example of authentication processing executed by the MFP according to the second exemplary embodiment.

FIG. 24 is a flowchart illustrating an example of the authentication processing of the MFP 102 according to the second exemplary embodiment. A program for carrying out each step in the flowchart of FIG. 24 is stored in a ROM 203 or a HDD 205 to be executed by a CPU 201.

The processing illustrated in FIG. 24 corresponds to that of the MFP 102 described in a broken line of the authentication processing illustrated in FIG. 20.

In the flowchart of FIG. 24, neither the processing of step S1203 of the flowchart of the authentication processing of the MFP 102 according to the first exemplary embodiment (selection Login Type) nor the processing of steps S1206 to S1211 is carried out. In other words, step S2401 illustrated in FIG. 24 corresponds to step S1201 illustrated in FIG. 12.

Figure 12:
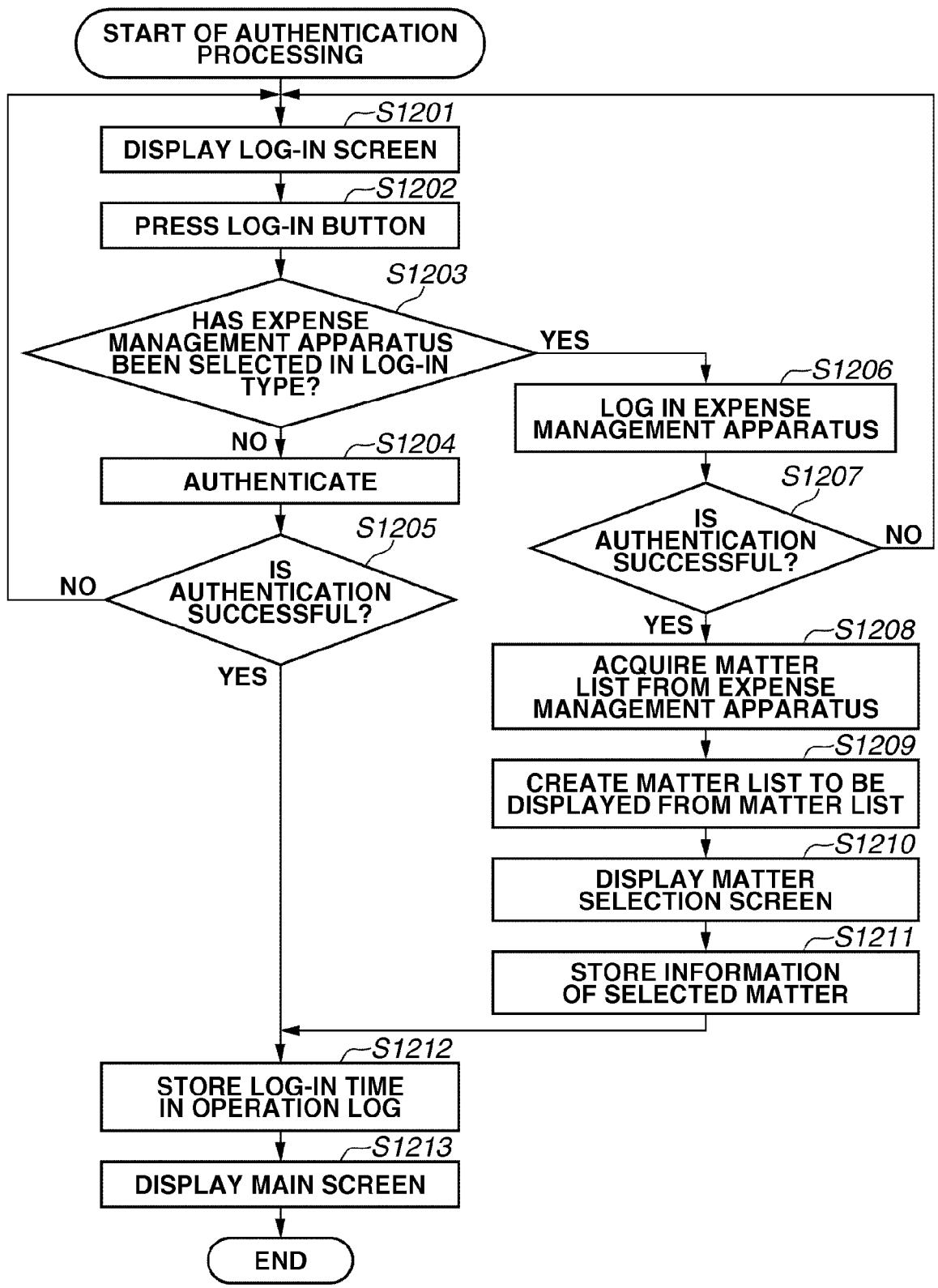
FIG. 12 is a flowchart illustrating an example of authentication processing executed by the MFP.

Step S2402 illustrated in FIG. 24 corresponds to step S1202 illustrated in FIG. 12. Step S2403 illustrated in FIG. 24 corresponds to step S1204 illustrated in FIG. 12. Step S2404 illustrated in FIG. 24 corresponds to step S1205 illustrated in FIG. 12. Step S2405 illustrated in FIG. 24 corresponds to step S1212 illustrated in FIG. 12. Step S2406 illustrated in FIG. 24 corresponds to step S1213 illustrated in FIG. 12.

Second Exemplary Embodiment

Cooperative Processing with Expense Management Apparatus 103 at MFP 102

Figure 25:
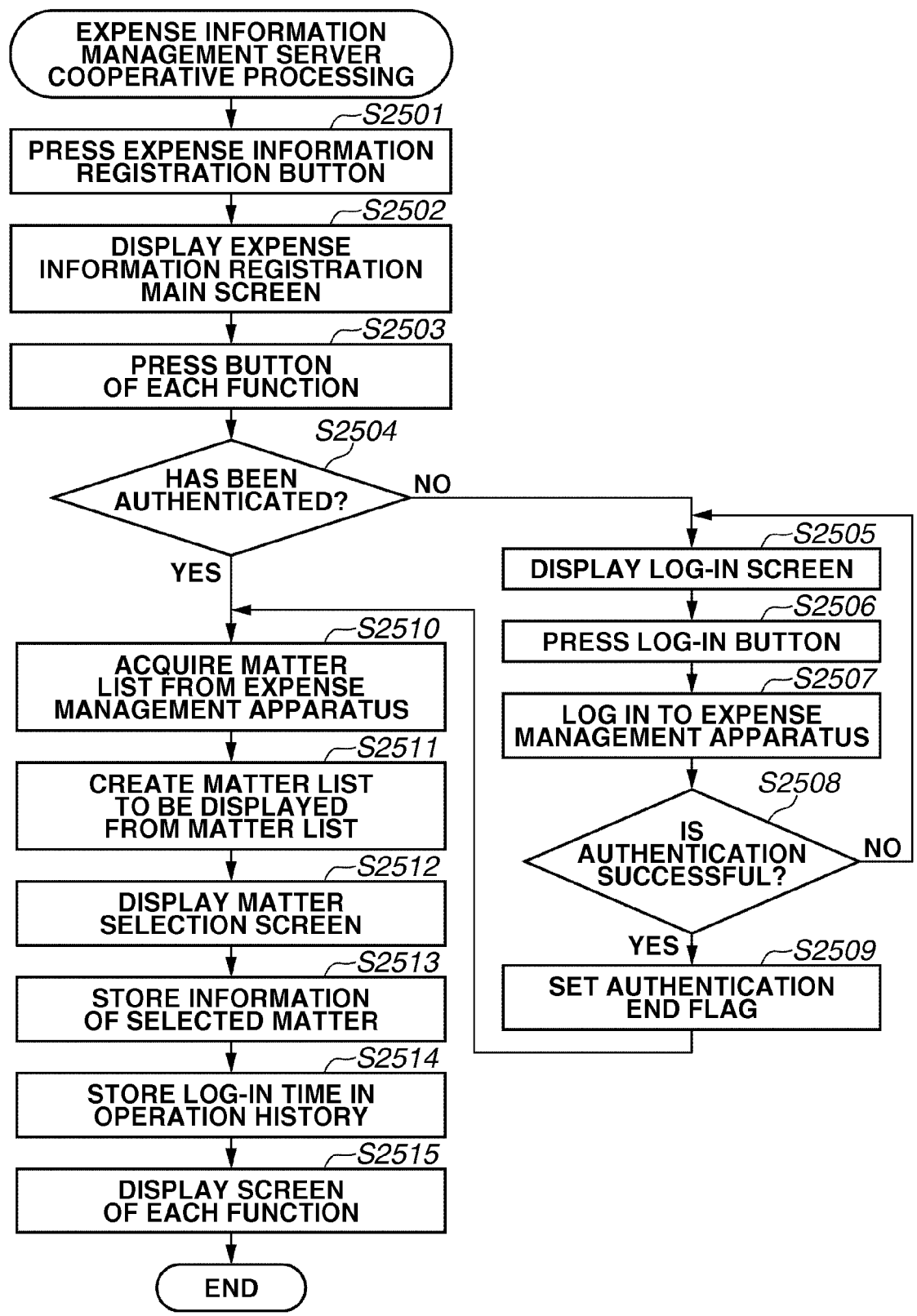
FIG. 25 is a flowchart illustrating an example of processing executed by the MFP in cooperation with the expense management apparatus according to the second exemplary embodiment.

FIG. 25 is a flowchart illustrating processing executed when the expense information registration button illustrated in FIG. 23 is pressed at the MFP 102 according to the second exemplary embodiment.

The processing illustrated in FIG. 25 corresponds to processing executed by the MFP 102 in cooperation with the expense management apparatus (server) described in the broken line illustrated in FIG. 20.

The processing illustrated in FIG. 25 is started from a displaying state of the main screen illustrated in FIG. 22 by the MFP 102. In step S2501, the authentication management application 416 detects pressing of the expense information registration button on the main screen. In step S2502, the authentication management application 416 displays the expense information registration main screen illustrated in FIG. 23.

In step S2504, on the expense information registration main screen, the authentication management application 416 of the MFP 102 that has detected the pressing of a start button of each function checks whether logging-in has been executed to the expense management apparatus 103. Determination is made by storing a flag indicating that authentication has been executed in the processing of step S2509 and referring to the flag.

When it is determined that the authentication of the expense management apparatus 103 has been completed (YES in step S2504), authentication processing is skipped. When not completed (NO in step S2504), in step S2505, the authentication management application 416 displays the log-in screen to the expense management apparatus 103 illustrated in FIG. 21.

The log-in screen may always be displayed without executing authentication end determination of step S2504.

In step S2506, on the log-in screen of the expense management apparatus 103, the MFP 102 detects pressing of a button indicating a start of logging-in. Then, in step S2507, the authentication management application 416 transmits a log-in request to the expense management apparatus 103 via an expense management apparatus cooperation application 417.

The log-in request includes an ID and a password acquired from the log-in screen. In step S1508, the authentication management application 416 that has received a reply to the log-in request to the expense management apparatus 103 determines whether authentication has been successful based on information included in return data to the log-in request.

In step S2509, when it is determined that the authentication has been successful (YES in step S2508), a flag indicating the successful authentication is stored.

Processing of steps S2510 to S2514 in the case of the successful authentication is similar to that of steps S1208 to S1212 illustrated in FIG. 12, and thus description thereof will be omitted.

In step S2515, a control unit of each function displays the screen of the function detected in step S2503.

Second Exemplary Embodiment

Copy Execution Processing of MFP 102

The copy execution processing flow of MFP 102 is similar to that illustrated in FIG. 14 in the second exemplary embodiment, and thus detailed contents will not be described.

The copy execution processing flow of MFP 102 according to the second exemplary embodiment corresponds to the processing of the MFP 102 described in the broken line of the execution function illustrated in FIG. 20.

Second Exemplary Embodiment

Expense Information Registration Processing of MFP 102

The expense information registration processing flow of MFP 102 in the second exemplary embodiment is similar to that illustrated in FIG. 16. This processing corresponds to the processing of the MFP described in the broken line of the expense information registration illustrated in FIG. 20.

The second exemplary embodiment has been described above. The second exemplary embodiment is advantageous in that when an operation is carried out for a plurality of different matters, there is no need to start over from authentication processing by first logging out from the MFP 102.

Embodiments of the present disclosure can also be realized by a computer of a system or apparatus that reads out and executes computer executable instructions recorded on a storage medium (e.g., non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-058654 filed Mar. 15, 2012, which is hereby incorporated by reference herein in its entirety.

What is claimed is:

1. An image processing apparatus for registering expense information in an expense management apparatus, comprising:
   a requesting unit configured to request an authentication of a user to the expense management apparatus;
   an acquisition unit configured to acquire pieces of matter information of the user authenticated by the expense management apparatus;
   a selection unit configured to select one of the pieces of matter information acquired by the acquisition unit;
   an image processing unit configured to execute image processing in accordance with an instruction of the user authenticated by the expense management apparatus; and
   a registration unit configured to register expense information based on the image processing executed as expense information of the matter information selected.

2. The image processing apparatus according to claim 1, further comprising a storage unit configured to store a start time and an end time of the image processing executed by the image processing unit,
   wherein the registration unit registers expense information including an elapsed time period calculated from the start time and the end time stored in the storage unit.

3. The image processing apparatus according to claim 1, further comprising:
   a detection unit configured to detect a user's operation; and
   a storage unit configured to store an operation log when the detection unit detects the user's operation,
   wherein the registration unit registers expense information including a time period calculated based on the operation log stored in the storage unit.

4. The image processing apparatus according to claim 1, further comprising a printing unit configured to print an image,
   wherein the registration unit registers expense information including a number of pages of sheets or a number of sheets printed by the printing unit.

5. The image processing apparatus according to claim 1, further comprising:
   an authentication unit configured to authenticate a user by using the user's identification information;
   a selection unit configured to select one of the expense management apparatus and the authentication unit for use to authenticate the user; and
   an acquisition unit configured to acquire pieces of matter information when the selection unit selects the authentication unit for use to authenticate the user.

6. The image processing apparatus according to claim 5, further comprising a display unit configured to extract and display information of a matter for which the user is responsible from the pieces of matter information acquired by the acquisition unit.

7. The image processing apparatus according to claim 6, wherein the display unit extracts and displays information of a matter in an active state from the pieces of matter information acquired by the acquisition unit.

8. An expense management system including an image processing apparatus and an expense management apparatus,
   wherein the image processing apparatus comprises:
      a requesting unit configured to request authentication of a user to the expense management apparatus;
      an acquisition unit configured to acquire pieces of matter information of the user authenticated by the expense management apparatus;
      a selection unit configured to select one of the pieces of matter information acquired by the acquisition unit;
      an image processing unit configured to execute image processing in accordance with an instruction of the user authenticated by the expense (cost) management apparatus; and
      a registration unit configured to register expense information based on the image processing executed by the image processing unit as expense information of the matter information selected by the selection unit in the expense management apparatus; and
   wherein the expense management apparatus comprises:
      an authentication unit configured to authenticate the user in response to a log-in request received from the image processing apparatus;
      a transmission unit configured to transmit the matter information in a case where the authentication unit has authenticated the user; and
      a management unit configured to manage the expense information registered by the image processing apparatus.

9. A method for controlling an expense management system including an image processing apparatus and an expense management apparatus, the method comprising:
   requesting an authentication of a user to the expense management apparatus;
   acquiring pieces of matter information of the user authenticated by the expense management apparatus;
   selecting one of the acquired pieces of matter information;
   executing an image processing;
   registering expense information based on the executed image processing as expense information of the selected piece of the matter information in the expense management apparatus;
   authenticating the user in response to a log-in request received from the image processing apparatus;
   transmitting the matter information after the user has been authenticated; and
   managing the expense information registered by the image processing apparatus.

10. A non-transitory computer storage medium for storing a program for causing a computer to function as each unit of the image processing apparatus according to claim 1.

* * * * *